US006965807B2

(12) United States Patent
Mito et al.

(10) Patent No.: US 6,965,807 B2
(45) Date of Patent: Nov. 15, 2005

(54) EQUIPMENT APPLICATION CALCULATING APPARATUS AND EQUIPMENT APPLICATION CALCULATING METHOD

(75) Inventors: Takashi Mito, Saitama (JP); Hideyuki Tanaka, Saitama (JP); Naoaki Nonaka, Saitama (JP); Masataka Yamamoto, Saitama (JP); Masashi Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/403,316

(22) Filed: Mar. 31, 2003

(65) Prior Publication Data

US 2003/0195724 A1 Oct. 16, 2003

(30) Foreign Application Priority Data

Mar. 29, 2002 (JP) ...................................... 2002-097934

(51) Int. Cl.⁷ ............................................. G06F 19/00
(52) U.S. Cl. ......................... 700/106; 700/97; 700/107
(58) Field of Search ........................... 700/97, 99, 106, 700/107, 117, 214, 216, 223, 233; 707/102, 104.1, 203, 205

(56) References Cited

U.S. PATENT DOCUMENTS

| 5,119,307 | A | * | 6/1992 | Blaha et al. ................. 700/107 |
| 5,202,836 | A | * | 4/1993 | Iida et al. .................... 700/101 |
| 5,742,288 | A | | 4/1998 | Nishizaka et al. |
| 5,777,877 | A | | 7/1998 | Beppu et al. |
| 5,822,210 | A | | 10/1998 | Kobayashi et al. |
| 5,838,965 | A | | 11/1998 | Kavanagh et al. |
| 5,864,875 | A | | 1/1999 | Van Huben et al. |
| 6,185,476 | B1 | | 2/2001 | Sakai |
| 6,223,094 | B1 | | 4/2001 | Muehleck et al. |
| 6,256,549 | B1 | | 7/2001 | Romero et al. |
| 6,438,535 | B1 | | 8/2002 | Benjamin et al. |
| 6,557,002 | B1 | | 4/2003 | Fujieda et al. |
| 6,662,179 | B2 | | 12/2003 | Benjamin et al. |
| 2001/0007997 | A1 | | 7/2001 | Fujieda |
| 2001/0016803 | A1 | | 8/2001 | Sartiono et al. |
| 2002/0032611 | A1 | | 3/2002 | Khan |
| 2003/0004988 | A1 | | 1/2003 | Hirasawa et al. |
| 2003/0055812 | A1 | * | 3/2003 | Williams et al. ................ 707/1 |
| 2003/0187870 | A1 | * | 10/2003 | Nakajima et al. ........... 707/102 |
| 2003/0212766 | A1 | | 11/2003 | Giles et al. |
| 2004/0098292 | A1 | | 5/2004 | Miller et al. |

FOREIGN PATENT DOCUMENTS

| EP | 0467257 | 1/1992 |
| EP | 0 467 257 A2 | 1/1992 |
| EP | 0895170 | 2/1999 |
| GB | 2 234 097 A | 1/1991 |
| GB | 2364801 | 2/2002 |
| JP | 09-20449 | 8/1997 |
| JP | 10-124550 | 5/1998 |
| JP | 2001-022811 | 1/2001 |
| JP | 2002-073708 | 3/2002 |
| WO | WO 03/038688 | 5/2003 |

* cited by examiner

Primary Examiner—Leo Picard
Assistant Examiner—Sean Shechtman
(74) Attorney, Agent, or Firm—Carrier, Blackman & Associates, P.C.; Joseph P. Carrier; William D. Blackman

(57) ABSTRACT

An equipment application calculating apparatus comprising a product variation calculating section which determines a product variation table based on variations of a product and specification of each of the product variations, the product variation table correlating each of the product variations and equipments related to the specifications of the product variations, a part applyipg section which determines a part property table for each item from the product variation table based on combinations of selected ones of the equipments to be mounted on the item. The part property table correlates each of the combinations of the selected equipments and a part. The apparatus also comprises a part table calculating section which determines a part table for the item from the product variation table and the part property table to correlate each of the product variations and the part.

19 Claims, 22 Drawing Sheets

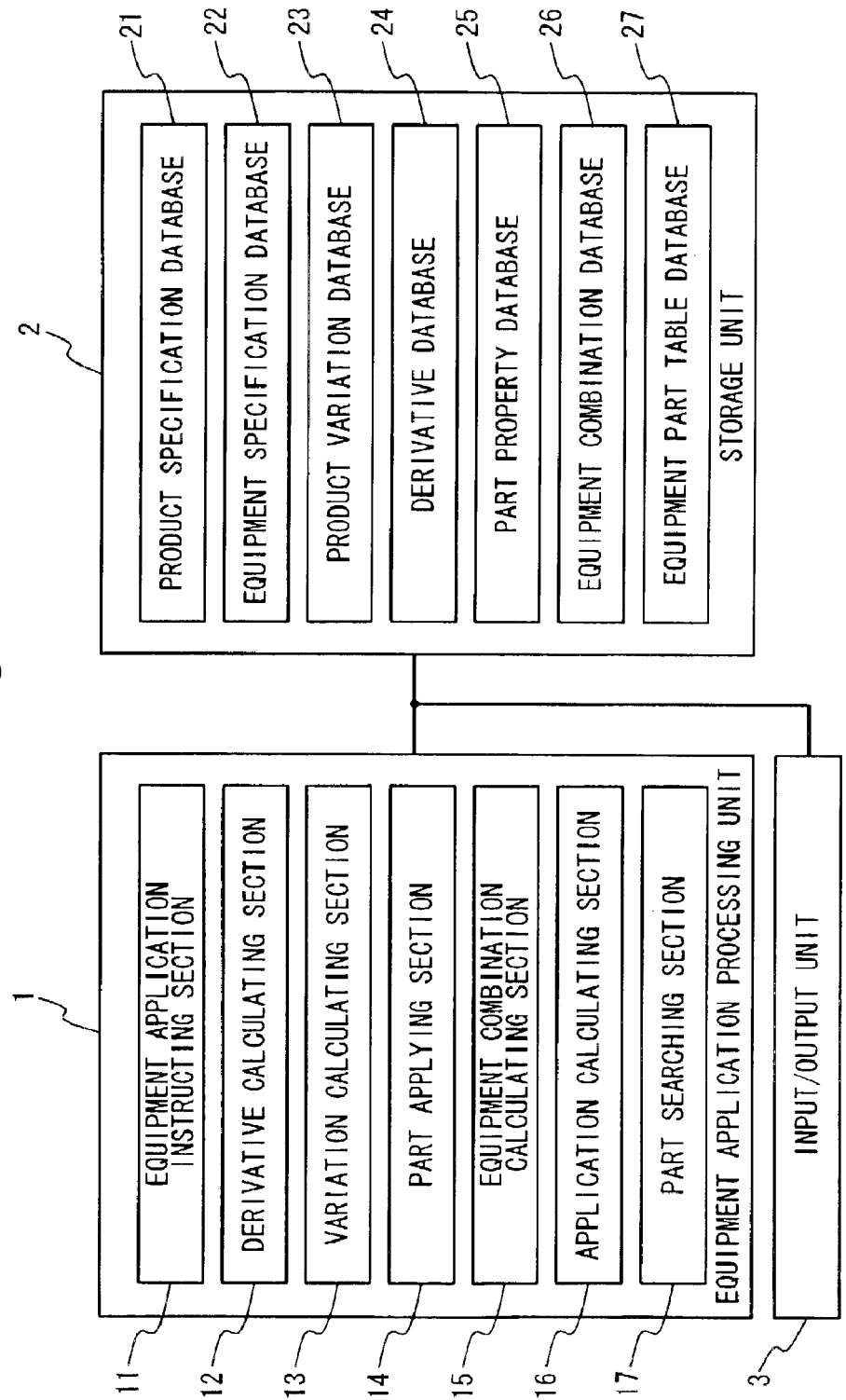

Fig. 2A

|  | A | | | B | | |
|---|---|---|---|---|---|---|
|  | 20E | 20T | 25S | 20E | 20T | 25S |
| MT | ○ | ○ | ○ | ○ | ○ | ○ |
| AT |  | ○ | ○ |  | ○ | ○ |
| SRS | ○ | ○ | ○ | ○ | ○ | ○ |
| ABS |  | ○ | ○ |  | ○ | ○ |
| C/C |  | F | ○ |  |  | ○ |

Fig. 2B

|  | 20E | 20T | 20T | 20T | 20T | 25S | 25S |
|---|---|---|---|---|---|---|---|
| MT | ○ | ○ | ○ |  |  | ○ |  |
| AT |  |  |  | ○ | ○ |  | ○ |
| SRS | ○ | ○ | ○ | ○ | ○ | ○ | ○ |
| ABS |  | ○ | ○ | ○ | ○ | ○ | ○ |
| C/C |  |  | ○ |  | ○ | ○ | ○ |
|  | 00 | 21 | 22 | 31 | 32 | 24 | 34 |

Fig. 6A

| | EX | DX | LX |
|---|---|---|---|
| MISSION | | | |
| MT | ○ | | |
| AT | ○ | ○ | ○ |
| S/R | | | |
| S/R | ○ | F | F |

Fig. 6B

| | EX | DX | LX |
|---|---|---|---|
| MISSION | | | |
| MT | ○ | | |
| AT | ○ | ○ | ○ |

Fig. 6C

| | EX | DX | LX |
|---|---|---|---|
| S/R | | | |
| S/R | ○ | F | F |

Fig. 7A

| MISSION | | |
|---|---|---|
| EX | DX | LX |
| 1 | 2 | 2 |
| 2 | | |

Fig. 7B

| MISSION | 1 | 2 |
|---|---|---|
| MT | O | |
| AT | | O |

Fig. 7C

| S/R | | |
|---|---|---|
| EX | DX | LX |
| 4 | 3 | 3 |
| | 4 | 4 |

Fig. 7D

| S/R | 3 | 4 |
|---|---|---|
| NO S/R | O | |
| S/R | | O |

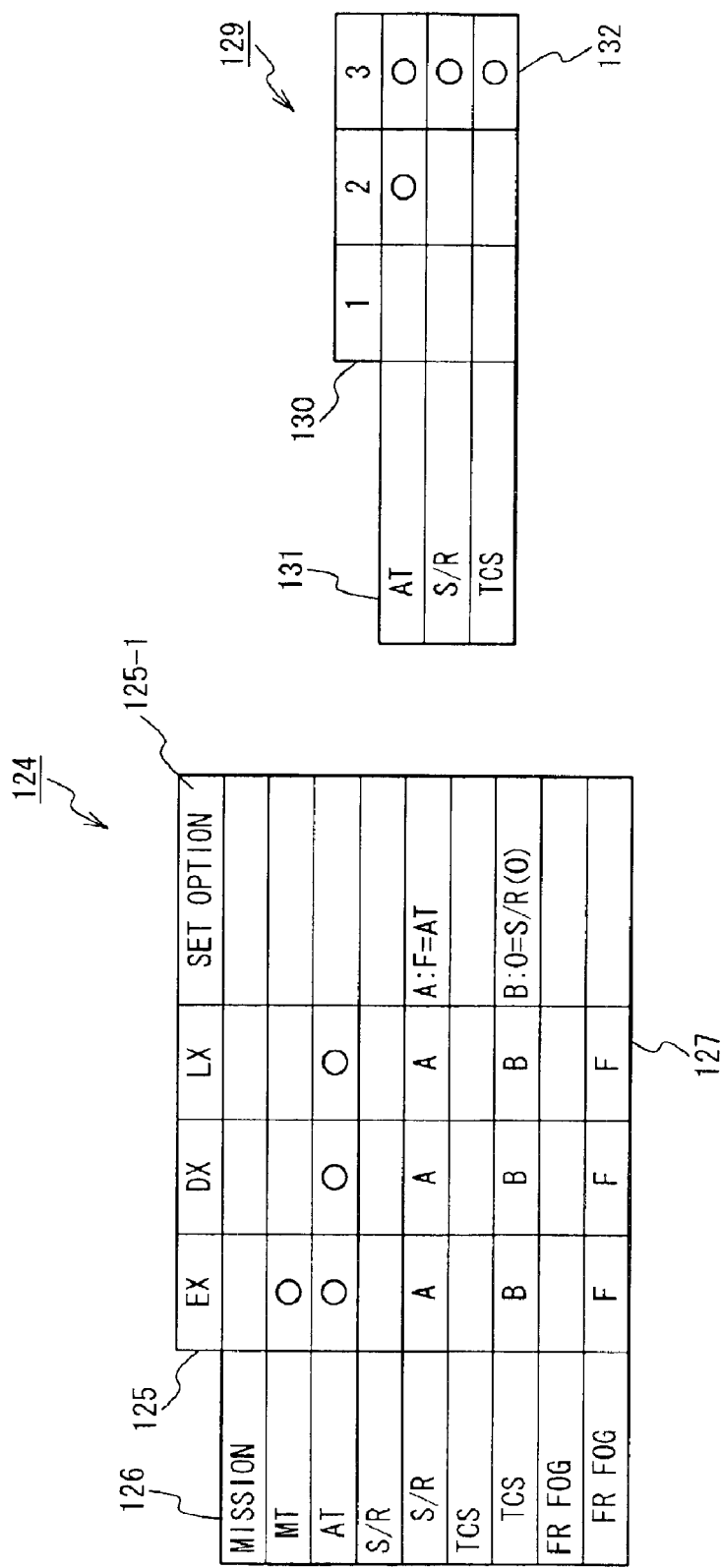

| | EX | DX | LX |
|---|---|---|---|
| MISSION | 1 | 2 | 2 |
| S/R | 2 | 2 | 3 |
| TCS | 3 | 3 | |

| MISSION | 1 | 2 | 3 |
|---|---|---|---|
| MT | ○ | | |
| AT | | ○ | |
| S/R | ○ | | |
| NO S/R | | ○ | |
| S/R | | | ○ |
| TCS | ○ | | |
| NO TCS | | ○ | |
| TCS | | | ○ |

| | EX | DX | LX |
|---|---|---|---|
| S/R | 4 | 4 | 4 |
| | 5 | 5 | 5 |

| | 4 | 5 |
|---|---|---|
| FR FOG | | |
| NO FR FOG | ○ | |
| FR FOG | | ○ |

| | EX | DX | LX |
|---|---|---|---|
| | 1-4 | 2-4 | 2-4 |
| | 1-5 | 2-5 | 2-5 |
| | 2-4 | 3-4 | 3-4 |
| | 2-5 | 3-5 | 3-5 |
| | 3-4 | | |
| | 3-5 | | |

| | MISSION | 1-4 | 1-5 | 2-4 | 2-5 | 3-4 | 3-5 |
|---|---|---|---|---|---|---|---|
| | MT | ○ | ○ | | | | |
| | AT | | ○ | ○ | ○ | ○ | ○ |
| | S/R | | | | | | |
| | NO S/R | ○ | ○ | ○ | ○ | | |
| | S/R | | | | ○ | ○ | ○ |
| | FR FOG | | | | | | |
| | NO FR FOG | ○ | ○ | ○ | | | |
| | FR FOG | | ○ | | ○ | ○ | ○ |
| 1 | 31200-SS0A-A | 1 | | | | | |
| 2 | 31200-SS1A-A | | 1 | | | | |
| 3 | 31200-SS2A-A | | | 1 | | | |
| 4 | 31200-SS3A-A | | | | 1 | | |
| 5 | 31200-SS4A-A | | | | | 1 | |
| 6 | 31200-SS5A-A | | | | | | 1 |

| MISSION | EX | DX |
|---|---|---|
| MT | O | |
| AT | O | O |
| S/R | F | |
| S/R | | O |
| FR FOG | | F |
| FR FOG | F | |
| K/E | | |
| K/E | | O |

| MISSION | EX | EX | EX | EX | DX |
|---|---|---|---|---|---|
| MT | O | O | | | |
| AT | | | O | O | O |
| S/R | | | O | | |
| NO S/R | O | O | | O | |
| S/R | | | | O | O |
| | J01 | J02 | J03 | J04 | J05 |

167, 168, 169, 170, 171

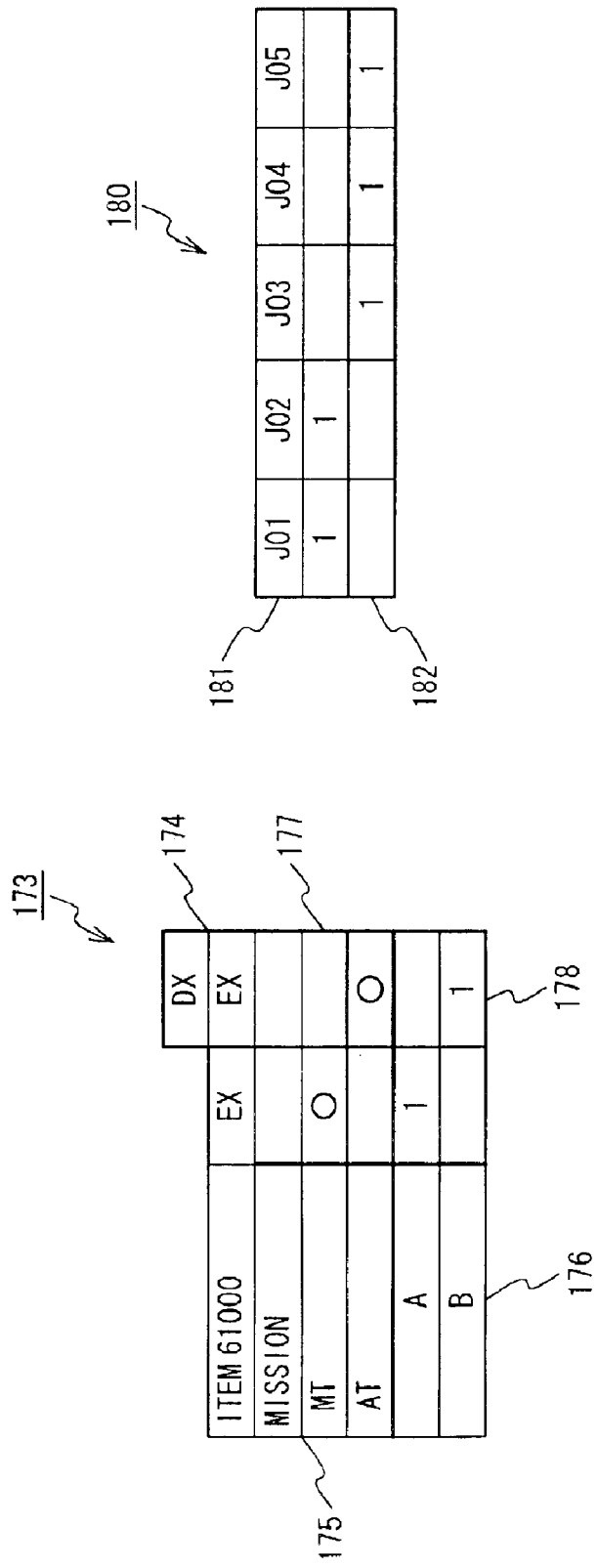

Fig. 14B

| | J01 | J02 | J03 | J04 | J05 |
|---|---|---|---|---|---|
| 192 | 1 | 1 | 1 | 1 | 1 |
| 193 | | | | | FI |

| ITEM 62100 | EX | DX | DX |
|---|---|---|---|
| | | EX | DX |
| NO S/R | ○ | | ○ |
| S/R | | ○ | |
| FR FOG | ○ | ○ | |
| NO FR FOG | | | ○ |
| FR FOG | | | |
| C | 1 | | |
| D | | 1 | |
| E | | | 1 |

| ITEM 63100 | EX | DX | LX |
|---|---|---|---|
| FR FOG | | | |
| NO FR FOG | ○ | ○ | |
| FR FOG | | | ○ |
| K/E | | | |
| NO K/E | ○ | | |
| K/E | | ○ | ○ |
| F | 1 | | |
| G | | 1 | |
| H | | | 1 |

Fig. 15B

| J01 | J02 | J03 | J04 | J05 |
|---|---|---|---|---|
| F1 | F1 | F1 | F1 | F1 |
| | | | | |
| | | | | F1 |

| ITEM | PART NUMER | DERIVATIVE CODE |
|---|---|---|
|  |  | J05 |
| 61000 | B | 1 |
| 62100 | D | 1 |
| 62100 | E | F1 |
| 63100 | G | F1 |
| 63100 | H | F1 |

| ITEM | PART NUMER | DERIVATIVE CODE |
|---|---|---|
|  |  | J05 |
| 61000 | B | 1 |

| 62100 | E | F1 |
|---|---|---|

| 63100 | H | F1 |
|---|---|---|

211 212 213

EQUIPMENT APPLICATION CALCULATING APPARATUS AND EQUIPMENT APPLICATION CALCULATING METHOD

BACKGROUND OF THE INVENTION

1. Field of the Invention

The present invention relates to an equipment application calculating apparatus and a designing support method, involving application of parts in a part table of a product.

2. Description of the Related Art

In designing an apparatus such as an automobile having a complex structure and composed of a number of parts, the parts are managed by using a part table. Here, the part table is the table for managing parent parts, i.e., main parts constituting the automobile, and child parts, i.e., parts constituting each parent part, a number of each part, data peculiar to each part such as a design change history of the part, an assembling unit in a product, a usage state and the like.

The following conventional designing technique is known in which the specification of a product is determined, variations of the product are determined and then parts to be used are determined for each of them. That is, in this method, a database for a part table is produced, and parts are represented as a relational tree structure. The parts to be used for each of the product variations are directly determined from the part table.

It is composed of a variation code input system and a part application input system. Here, the variation code input system sets identifiers (variation codes) for the number of the product variations. The part application input system inputs a part number, a kind code of the part number and the number of parts to the variation code.

A designer sets the variation code for the number of the product variation using the variation code input system. A designer of a part directly inputs the application of parts of the highest level (level 1) to each variation code using the part application input system. At this time, the designer inputs the application of the part while giving a difference to the part as necessary, in accordance with the difference in the product resulting from the variation. Consequently, a set of the parts in the level 1 is established for each product variation.

As a result, the parts for one kind of a product can be taken out by extracting all of the parts in the level 1 applied to a certain variation code and the lower level parts linked to the parts in the level 1.

In the above-mentioned technique, the confirmation of the difference in specification between the original product and the variation is entrusted to the designer. The will of the designer that parts of what part numbers are set for a variation of what specification is not recorded as data. Thus, an automatic input check could not be carried out. For this reason, the application of the parts needs to be manually carried out in case of an occurrence of an application miss, the increase or decrease of the product variations in relation to a change of a product specification, the change of an optional specification and the like. Therefore, it is difficult to follow the change of the product specification quickly and precisely.

Conventionally, the number of the combinations of options is hundreds of millions. Thus, the typical variations of the product are often managed in only the combinations of basic equipments.

In this case, nevertheless, the number of the variations is 1,000 or more. Thus, it is difficult to manually carry out the calculation quickly and accurately. Also, only the management of the typical variations is carried out. Therefore, a part of a different option is registered for a certain variation. Therefore, there is a problem that the parts corresponding to one kind of a product in which an optional equipment is used cannot be automatically extracted.

A technique is desired that can protect against a miss in the application of the parts. Also, a technique is desired that can automatically update the application of parts to generation of a new variation. Also, a technique is desired that can carry out a part search using an option specification part as a key. Moreover, a technique is desired that can manage all of the variations of products.

SUMMARY OF THE INVENTION

Therefore, an object of the present invention is to provide an equipment application calculating apparatus and a designing support method that can protect against a miss in the application of parts.

Another object of the present invention is to provide an equipment application calculating apparatus and a designing support method that can automatically update the application of parts to generation of a new variation.

Still another object of the present invention is to provide an equipment application calculating apparatus and a designing support method that can carry out a part search using an option specification part as a key.

Still another object of the present invention is to provide an equipment application calculating apparatus and a designing support method that can manage all of the variations of products.

In order to achieve an aspect of the present invention, an equipment application calculating apparatus includes a product variation calculating section, a part applying section and a part table calculating section. The product variation calculating section determines a product variation table based on variations of a product and a specification of each of the product variations, the product variation table correlating each of the product variations and equipments related to the specifications of the product variations. The part applying section determines a part property table for each of the items from the product variation table based on combinations of selected ones of the equipments to be mounted on the item. The part property table correlates each of the combinations of the selected equipments and a part. The part table calculating section determines a part table for the item from the product variation table and the part property table to correlate each of the product variations and the part.

The product variation calculating section may include an equipment application instructing section, a derivative calculating section and a variation calculating section. The equipment application instructing section determines an equipment specification table based on the specification of each of the product variations to correlate each of the product variations and each of the equipments. The derivative calculating section determines a combination table from the equipment specification table to indicate possible combinations of the equipments. The variation calculating section determines the product variation table from the combination table based on the product variations. In this case, the equipment application calculating apparatus may further include an equipment specification database which stores the equipment specification table divisionally for each of the equipments.

Also, the part table calculating section may include an equipment combination calculating section and an application calculating section. The equipment combination calculating section extracts product variations associated with combinations of the selected equipments as extraction product variations from the part property table. The application calculating section determines the part table from the part property table and the production variation table.

Also, the equipment application calculating apparatus may further include a part searching section which searches the parts containing a designated equipment by using the product variation table and the part property table.

In another aspect of the present invention, a designing support method may be achieved by (a) determining a product variation table based on variations of a product and a specification of each of the product variations, the product variation table correlating each of the product variations and equipments related to the specifications of the product variations; by (b) determining a part property table for each of the items from the product variation table based on combinations of selected ones of the equipments to be mounted on the item, wherein the part property table correlates each of the combinations of the selected equipments and a part; and by (c) determining a part table for the item from the product variation table and the part property table to correlate each of the product variations and the part.

Here, the step of (a) determining a product variation table may be achieved by determining an equipment specification table based on the specification of each of the product variations to correlate each of the product variations and each of the equipments; by determining a combination table from the equipment specification table to indicate possible combinations of the equipments; and by (d) determining the product variation table from the combination table based on the product variations. In this case, the step of (d) determining the product variation table may be achieved by allocating identifiers different from each other to each of the combinations of the equipments; and by correlating each of the product variations to each of the equipments.

Also, the designing support method may further include storing the equipment specification table in an equipment specification database divisionally for each of the equipments.

Also, the step of (c) determining a part table may be achieved by extracting the product variations associated with combinations of the selected equipments as extraction product variations from the part property table; and by determining the part table from the part property table and the production variation table.

Also, the step of (b) determining a part property table may be achieved by designating the item; by selecting the selected equipments from among the equipments; removing duplication of the combinations of the selected equipments for the item; and by correlating each of the combinations of the selected equipments to the part for the item.

Also, the designing support method may further include designating one of the product variations from the product variation table; and retrieving the parts used for the designated product variation from the part property tables for the items for the designated variation.

Another aspect of the present invention is directed to a program stored in a recording medium and executed by a computer. The program includes the functions of: (a) determining a product variation table based on variations of a product and a specification of each of the product variations, the product variation table correlating each of the product variations and equipments related to the specifications of the product variations; (b) determining a part property table for each of the items from the product variation table based on combinations of selected ones of the equipments to be mounted on the item, wherein the part property table correlates each of the combinations of the selected equipments and a part; and (c) determining a part table for the item from the product variation table and the part property table to correlate each of the product variations and the part.

The function of (a) determining a product variation table comprises the functions of: determining an equipment specification table based on the specification of each of the product variations to correlate each of the product variations and each of the equipments; determining a combination table from the equipment specification table to indicate possible combinations of the equipments; and (d) determining the product variation table from the combination table based on the product variations. In this case, the function of (d) determining the product variation table comprises the functions of: allocating identifiers different from each other to each of the combinations of the equipments; and correlating each of the product variations to each of the equipments.

The program may further include the function of: storing the equipment specification table in an equipment specification database divisionally for each of the equipments.

Also, the function of (c) determining a part table may include the functions of: extracting the product variations associated with combinations of the selected equipments as extraction product variations from the part property table; and determining the part table from the part property table and the production variation table.

Also, the function of (b) determining a part property table may include the functions of: designating the item; selecting the selected equipments from among the equipments; removing duplication of the combinations of the selected equipments; and correlating each of the combinations of the selected equipments to the part.

Also, the program may further include designating one of the product variations from the product variation table; and retrieving the parts used for the designated product variation from the part property tables for the items for the designated variation.

BRIEF DESCRIPTION OF THE DRAWINGS

FIG. 1 is a diagram showing the configuration of an equipment application calculating apparatus according to an embodiment of the present invention;

FIG. 2A is a diagram showing a type based equipment specification table, and FIG. 2B is a diagram showing a type-based equipment table;

FIG. 6A is a diagram showing a type based equipment specification table, FIGS. 6B and 6C are diagrams showing type-based individual equipment tables, each of which indicates management of an equipment in a type based equipment specification table;

FIG. 7A is a diagram showing a type-based equipment ID table for an equipment, FIG. 7B is a diagram showing an equipment ID table for the equipment, FIG. 7C is a diagram showing a type-based equipment ID table for another equipment, and FIG. 7D is a diagram showing an equipment ID table for the other equipment;

FIG. 9A is a diagram showing the type based equipment specification table, and FIG. 9B is a diagram explaining a management of data for each equipment in an type based equipment specification table;

FIG. 10A is a diagram showing a type-based equipment ID table for an equipment, FIG. 10B is a diagram showing an equipment ID table for the equipment, FIG. 10C is a diagram showing a type-based equipment ID table for another equipment, and FIG. 10D is a diagram showing an equipment ID table for the other equipment;

FIG. 11A is a diagram showing an equipment variation, and FIG. 11B is a diagram showing a equipment-part number table;

FIG. 12A is a diagram showing an type based equipment specification table, and FIG. 12B is a diagram showing a type-based equipment table;

FIG. 13A is a diagram showing a equipment-part number table of an item 61000 in an type based equipment specification table, and FIG. 13B is a diagram showing a code part corresponding table;

FIG. 14A is a diagram showing a equipment-part number table of an item 62100 in an type based equipment specification table, and FIG. 14B is a diagram showing a code part correspondence table;

FIG. 15A is a diagram showing a equipment-part number table of an item 63100 in an type based equipment specification table, and FIG. 15B is a diagram showing a code part correspondence table;

FIG. 16A is a diagram showing a product variation part number table, and FIG. 16B is a diagram showing a product variation part number table;

DESCRIPTION OF THE PREFERRED EMBODIMENTS

Figure 3A:
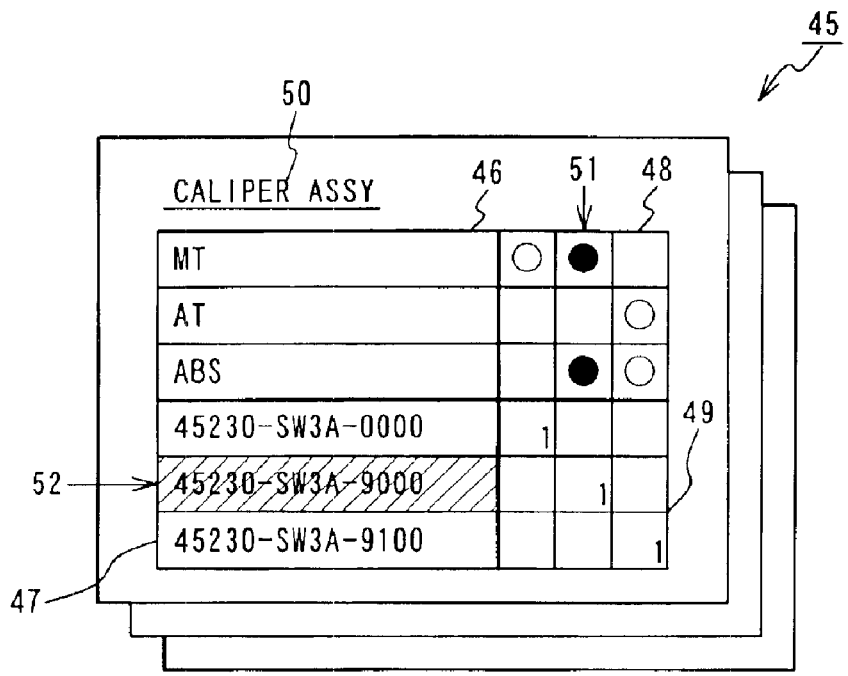
FIG. 3A is a diagram showing an equipment-part number table.

Hereinafter, an equipment application calculating apparatus and a designing support method according to the present invention will be described below with reference to the attached drawings. The equipment application calculating method according to the present invention functions as a designing support apparatus using the equipment application calculating apparatus. Below, the present invention will be described using the design of an automobile as an example. However, the present invention can be also applied to a design of another apparatus having a complex structure and composed of a number of parts.

FIG. 1 is a diagram showing the configuration of the equipment application calculating apparatus according to an embodiment of the present invention. The equipment application calculating apparatus is a data processing apparatus exemplified as a workstation and a personal computer. The equipment application calculating apparatus includes an equipment application processing unit 1, a storage unit 2 and an input and output unit 3. The equipment application processing unit 1 operates based on a program which is loaded into the unit 1 from a recording medium.

The equipment application processing unit 1 will be described. In this embodiment, a kind of a product designates a kind of an automobile. A type designates a grade of the kind of the automobile such as 20E, 20T and 25S or EX, DX and LX. The specification of the product contains designation of equipments to be provided in each type of each model. The equipments are such as a transmission (MT (manual transmission), AT (automatic transmission)), an air bag (SRS: supplemental restraint system), an antilock brake system (ABS), and a cruise control (C/C) and whether each of the equipments should be provided is designated based on the specification of the product.

The equipment application processing unit 1 is composed of an equipment application instructing section 11, a derivative calculating section 12, a variation calculating section 13, a part applying section 14, an equipment combination calculating section 15, an application calculating section 16 and a part searching section 17.

The equipment application instructing section 11 stores product specification data inputted from the input and output unit 3 by a designer for each of the types of products into a product specification database 21. Also, the equipment application instructing section 11 produces an equipment specification table in accordance with the product specification data to indicate equipments to be used in each of the types of products. Then, the equipment application instructing section 11 stores the equipment specification table in an equipment specification database 22. The product specification data contains a kind and type of the product and the specification of the product and is previously stored in a product specification database 21.

The derivative calculating section 12 calculates possible combinations of equipments for each of variations of the types of the products as production variations from the equipment specification table. The combinations of equipments are stored in a derivative database 24.

The variation calculating section 13 determines a product variation table in accordance with the combinations of equipments determined by the derivative calculating section 12. The product variation table indicates possible combinations of equipments to be used for each of the product variations. The designer inputs a product variation code to each product variation of the product variation table from the input and output unit 3. The product variation table is stored in a product variation database 23.

The part applying section 14 produce a part property table indicating possible combinations of selected equipments to be applied for each of the items in accordance with an input from the input and output unit 3 by the designer. Then, the part applying section 14 sets a part number and the number of parts for each of the possible combinations of selected equipments in the combination table. The part number indicates each of the combinations of the equipments to be applied to the item. Thus, a part property table is completed, and is stored in a part property database 25.

The equipment combination calculating section 15 extracts product variations and product variation codes for a selected combination of equipments from the part property table as extraction product variations. The extraction product variations are stored in an equipment combination database 26.

The application calculating section 16 produces a part table in accordance with product variation codes of the extraction product variations. The part table indicates a relation of a part notation, a part number, and the number of parts. Also, the part table indicates the part notation in relation to each of the product variation codes. The part table is stored in an equipment part table database 27.

The part searching section 17 searches a part having a different specification from the product variation table and the part property table.

Also, in accordance with the designation of one equipment, all of the parts used in a product having a designated equipment are taken out from the product variation code and the part property table.

The product specification database 21 stores the kind of the product and specification of the product. The equipment specification database 22 stores the equipment specification table. The product variation database 23 stores the product variation table. The derivative database 24 stores an equipment ID data for each of the mission and the like and equipment ID data for each type. Also, it may store the equipment variation. The part property database 25 stores the part property table. The equipment combination database 26 stores the extraction product variations. The equipment part table database 27 stores the part table.

The input and output unit 3 has a keyboard and a mouse as an input unit, and a display and a printer as an output unit.

Figure 17:
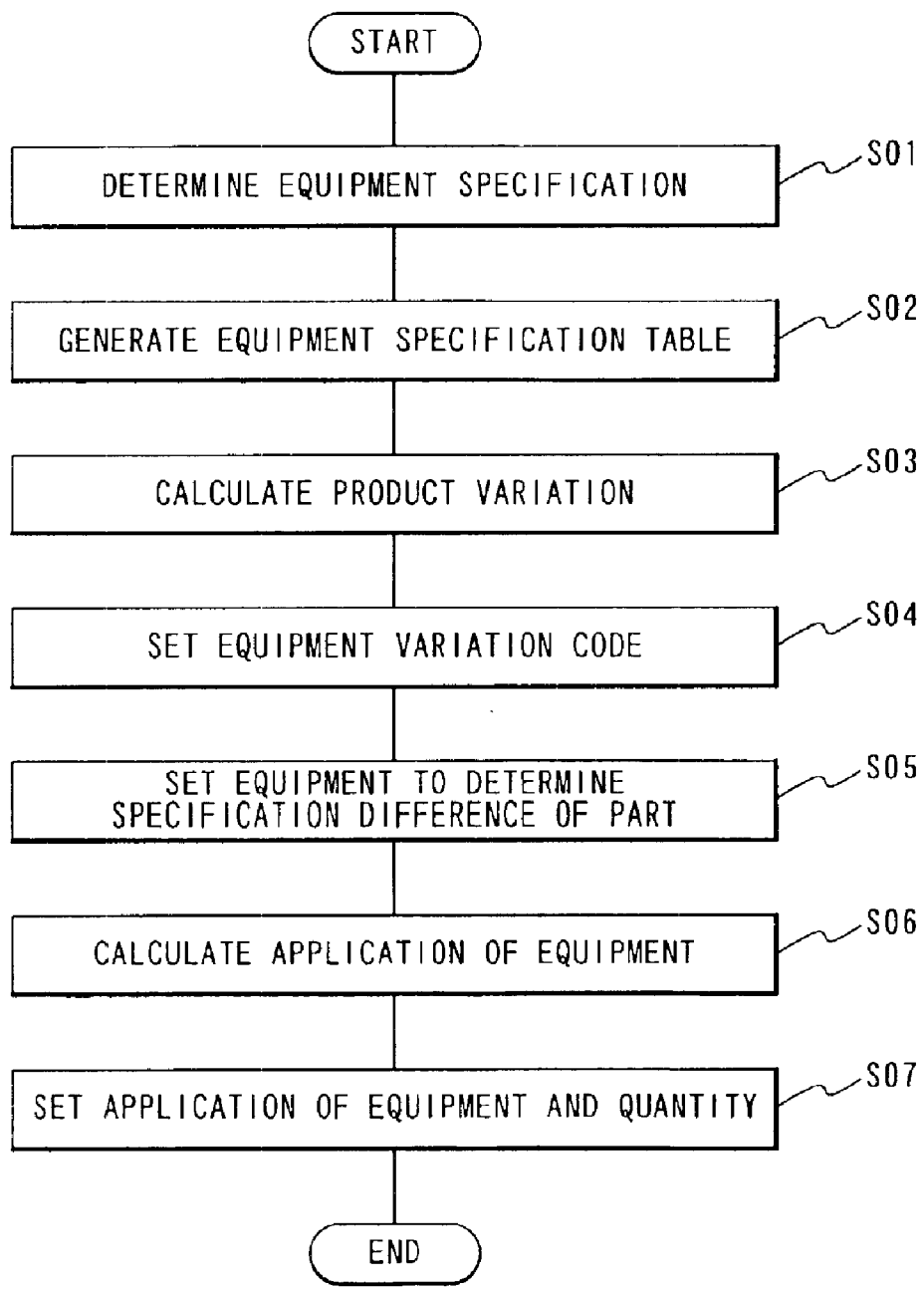
FIG. 17 is a flowchart showing an embodiment of a designing support method of the present invention.

An operation of the equipment application calculating apparatus according to the embodiment of the present invention will be described below with reference to the drawings. FIG. 17 is a flowchart showing the operation of the equipment application calculating apparatus in this embodiment.

(1) Step S01

A designer designates the product specification data from the input and output unit 3. The product specification data contains a kind of a product, a type or grade of the product, equipments to be used, and a combination of the equipments. The product specification data is stored in the product specification database 21.

(2) Step S02

The equipment application instructing section 11 refers to the product specification database 21 and produces the equipment specification table in accordance with the product specification data. Then, the equipment specification table is stored in the equipment specification database 22.

The equipment specification table will be described. FIG. 2A is a diagram showing the equipment specification table. The equipment specification table 31 correlates each of the types of products and equipments to be used. The equipment specification table 31 has automobile kind columns 32, type columns 33, equipment rows 34 and check fields 35. The automobile kind column 32 indicates a kind of an automobile. The kinds A and B are shown in the equipment specification table 31. The type column 33 shows a type or grade of the kind of the automobile. For example, in case of the kind A, the three types of a type 20E, a type 20T and a type 25S are shown in the equipment specification table 31. The equipment row 34 shows an equipment. MT, AT, SRS, ABS and C/C are exemplified as equipments in the equipment specification table 31. The check field 35 shows the relation between the type and the equipment. For example, in case of the type 20E of the kind A, white circles are noted in the equipments rows of MT and SRS in the table shown in FIG. 2A. This indicates that only those equipments are installed in the product. By the way, F indicates an option.

That is, the step S02 is a process for determining the data in the check fields 35 to correlate a data related to the type column 33 (and the automobile kind column 32) and a data related to the equipment column 34 in accordance with the product specification data.

(3) Step S03

The derivative calculating section 12 produces a combination table indicating the possible combinations of equipments for product variations containing the types of the products and variations of the product for each type. The producing method will be described later. The combination table may be stored in the derivative database 24.

(4) Step S04

The variation calculating section 13 produces the product variation table from the combination table and the equipment specification table. The product variation table is stored in the product variation database 23.

Here, the product variation table will be described. FIG. 2B is a diagram showing the product variation table. The product variation table 38 indicates equipments to be used for each of the product variations. The product variation table 38 has type columns 39, equipment rows 40, a product variation code row 41 and check fields 42. The type column 39 shows the type or grade of each of the product variations. This column is the same as the type column 33 in the equipment specification table 31 shown in FIG. 2A. FIG. 2B shows only the product variations corresponding to the kind A. In this case, the type column 39 is shown in the product variation table 38 for each of the product variations. Thus, the type 20T as one of the product variations has four production variations. The equipment row 40 shows an equipment, and corresponds the equipment row 34 in the equipment specification table 31 shown in FIG. 2A. The product variation code column 41 shows a code for each of the product variations. The product variation code in the row 41 is inputted for every type or production variation from the input and output unit 3 by the designer so that different data are set for all of the product variations in accordance with a proper rule. Each of the check fields 42 shows the relation between the product variations and the equipments. For example, the fact that the type 20T has the four product variations can be calculated from the column of the type 20T for the kind A in the equipment specification table 31 shown in FIG. 2A. The four product variation codes 21, 22, 31, and 32 are allocated to the type 20T of the product variation table 38 shown in FIG. 2B. Only the equipments having white circles in the check fields 42 are installed for each of the product variations.

That is, the step S04 is the process for determining the data in the check field 42 for each of the plurality of product variations based on the equipment specification table 31.

(5) Step S05

The designer selects a combination of equipments which are applied to each of the items from the product variation table 38 by using the input and output unit 3. Then, the designer inputs the selected combination of equipments to the part applying section 14. The part applying section 14 produces possible variations of the combination in accordance with the selected combination of equipments. The calculating method will be described later. Then, the part property table is produced in accordance with a plurality of part numbers inputted from the input and output unit 3 by the designer. The part property table is stored in the part property database 25.

Here, the part property table will be described. FIG. 3A is a diagram showing the part property table. The part property table 45 indicates combinations of equipments to be applied to the item CALIPER ASSY. The part property table 45 has equipment rows 46, part number rows 47, check fields 48, application number fields 49 and an item field 50. The equipment row 46 shows the equipment. The part number row 47 shows a part number for a corresponding combination of equipment. The check field 48 shows a possible combination of the equipments in the equipment rows 46. The application number field 49 indicates the number of the parts in the part number row 47. The item field 50 shows a name of the item to which the parts in this part property table are applied.

The equipments in the rows 46 are selected depending on which of the equipments should be mounted on the item. That is, as for the part to be used in an assembly CALIPER ASSY defined in the item field 50, the designer determines transmissions of MT and AT and ABS from among the plurality of equipments. Thus, checks are carried out in the check fields 48 for possible combinations of the selected equipments. The part number and the number of the parts are automatically or manually determined based on the number of the combinations. At this time, as the number of parts in the application number fields 49, "1" is automatically set as an initial value (default). The number of parts in the application number field 49 can be changed thereafter. Then, the designer selects one of combinations of the selected equipments.

That is, the part applying section 14 determines three combinations of the selected equipments from MT, AT and ABS as the selected equipments. However, since there is no combination of AT+ABS in the product specification data, the combination is excluded. Also, the initial value "1" is automatically set in the application number field 49. The designer determines the three parts and their part numbers (45230-SW3A-0000, 9000, 9100) for the three combinations of the selected equipments. Then, the designer may change the application number of parts in each of the three parts in the fields 47 corresponding to each of the three combinations of the selected equipments, if necessary.

That is, the step S05 is the process for determining the selected equipments in the equipment rows 46, calculating the combinations of the selected equipments in the equipment check fields 48 in accordance with the equipments in the rows 46, and further obtaining the part property table which correlates the equipments, the part numbers and the equipment check fields 48.

(6) Step S06

The equipment combination calculating section 15 extracts the product variations having the combinations of selected equipments as the extraction product variations from the product variation table in accordance with the combinations of selected equipments. The extraction product variations are stored in the equipment combination database 26.

Figure 3B:
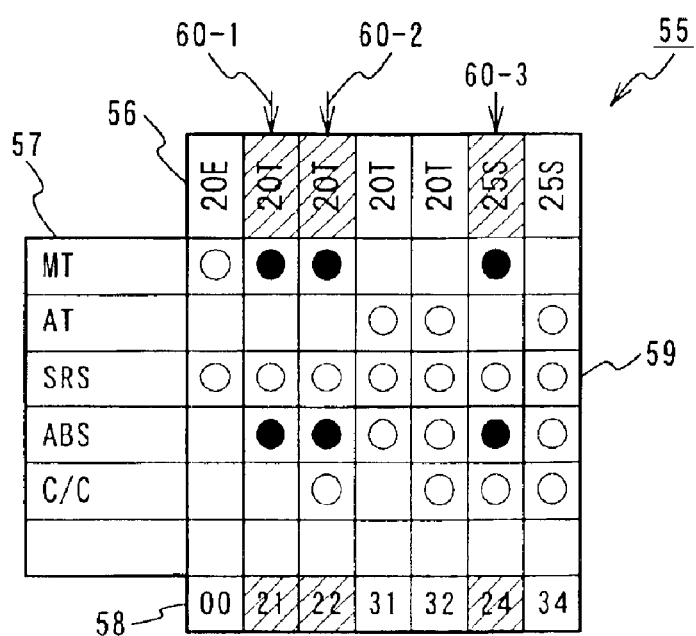
FIG. 3B is a diagram showing a type-based equipment table for explaining an extraction product variation.

Here, the extraction product variation will be described. FIG. 3B is a diagram showing the product variation table to explain the extraction product variation. The product variation table 55 is the same as the product variation table 38 shown in FIG. 2B. That is, the product variations are correlated with the equipments. Type columns 56, equipment rows 57, a product variation code row 58 and check fields 59 correspond to the type columns 39, the equipment rows 40, the product variation code row 41 and the check fields 42, respectively. As for each of the combinations of selected equipments in the part property table, the product variations having the combinations of the respective equipments and production variation codes are extracted from the product variation table.

That is, with reference to FIG. 3A, when the check fields 48 in the column 51 are exemplified, there are checks in MT and ABS (the existence of the check implies that there is a white round or a black round on the drawing). The fact that the column 51 corresponds to a part number 45230-SW3A-9000 on a row 52 of the part number rows 47 is known from the application number in the application number field 49. On the other hand, shown in FIG. 3B, the combinations of the product variation code row 58 and the type columns 56 in which there are the checks in MT and ABS in the check fields 59, i.e., including the set of MT and ABS are (20T, 21), (20T, 22) and (25S, 24) indicated in columns 60-1 to 60-3 in the type columns 56. That is, (20T, 21), (20T, 22) and (25S, 24) are extracted as the extraction product variations, in which the part number 45230-SW3A-9000 corresponding to the combination of the equipments of MT and ABS is allocated.

That is, the step S06 is the process for extracting the product variations to which the combinations of the selected equipments are applied from the product variation table, in accordance with the combinations of selected equipments and the product variations.

(7) Step S07

The application calculating section 16 produces a part table for the item, e.g., the assembly CALIPER ASSY in accordance with the extraction production variations and the product variation codes of the extraction product variations. The part application is determined for each of the product variation codes. The part table is stored in the equipment part table database 27.

Figure 3C:
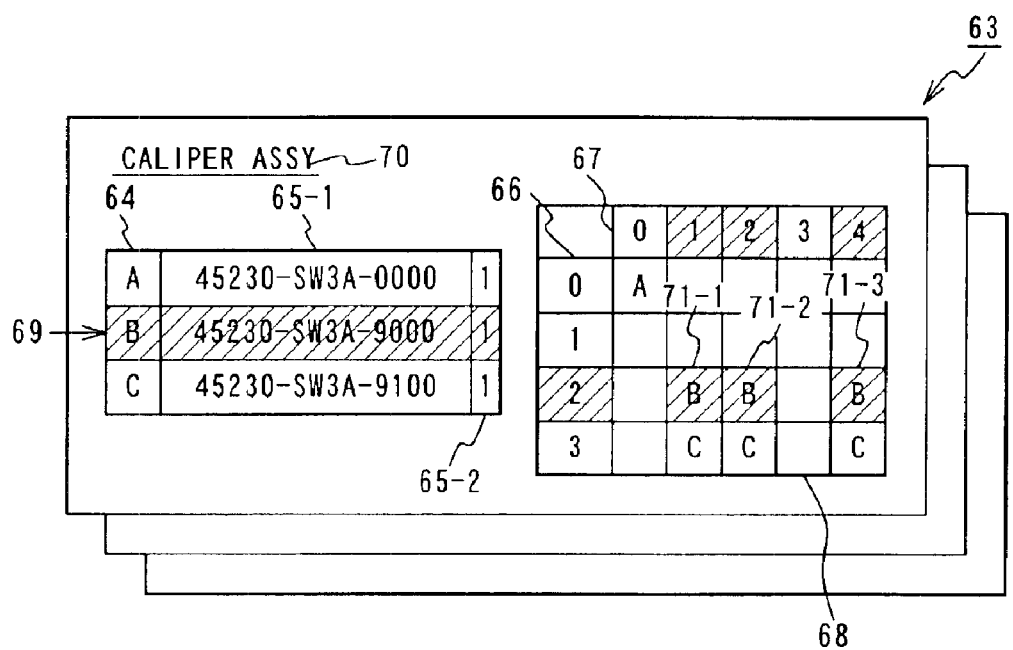
FIG. 3C is a diagram showing a part table.

The part table will be described. FIG. 3C is a diagram showing the part table. The part table 63 correlates the parts and the combinations of the equipments. The part table 63 has part notation rows 64, part number rows 65-1, the application number rows 65-2, product variation code A rows 66, product variation code B columns 67, part fields 68 and an item field 70. The part notation row 64 indicates a notation indicative of the part. The part number row 65-1 indicates a part number. These rows correspond to the part number rows 47 shown in FIG. 3A, since they are for the same item (CALIPER ASSY). The application number row 65-2 shows the application number of the parts. These rows correspond to the application number fields 49 shown in FIG. 3A. The product variation code A row 66 designates the numeral on one digit (here, the left side of a two-digit numeral) of a corresponding product variation code in the product variation code row 58. The product variation code B column 67 designates the numeral on the other digit (the right side) of the corresponding product variation code in the product variation code row 58. The part field 68 designates the notation of the part in the part notation column 64 to be applied to an extraction equipment variation code specified by the product variation code A row 66 and the product variation code B column 67. The item field 70 indicates a name of an item to which the part in this part table is applied. The item field is the same as the item field 50 shown in FIG. 3A.

The part is specified for one of the combinations of selected equipments. The product variation codes are determined for the extraction product variations corresponding to the selected combination of the selected equipments. The part table is produced in accordance with the part (the part number) and the extraction product variation codes. That is, as for the part used in the assembly CALIPER ASSY (the item 70), the part (the part number 45230-SW3A-9000) on the row 52 (FIG. 3A) is specified for the combination of selected equipments (MT and ABS) on the column 51 shown in FIG. 3A. (20T, 21), (20T, 22) and (25S, 24) are extracted as the extraction product variations in which the part number 45230-SW3A-9000 corresponding to the combination of selected equipments (MT and ABS) shown in FIG. 3B is installed. At that time, the extraction product variation codes are 21, 22 and 24, respectively. Here, the extraction product variation codes (21, 22 and 24) are dissolved to (2, 1), (2, 2) and (2, 4), respectively. They are correlated to (the product variation code A row 66, the product variation code B column 67)=(2, 1), (2, 2) and (2, 4). The part (B, the part number 45230-SW3A-9000 on the row 69) corresponding to the extraction product variation code 21 is noted in the field 71-1 of (the product variation code A row 66, the product variation code B column 67)=(2, 1). The fields 71-2, 71-3 of (the product variation code A rows 66, the product variation code B columns 67)=(2, 2), (2, 4) are similar. In this way, the part table is produced which indicates the relation between the extraction product variation codes (21, 22 and 24) specified by the product variation code A rows 66 (0 to 3) and the product variation code B columns 67 (0 to 4) and the part column 68 applied thereto. Other columns are similarly embedded.

That is, the step S07 is the process for producing the part table in accordance with the product variation codes and the extraction product variations.

The above-mentioned processes are described by exemplifying some of the equipments, the items and the parts with regard to the design of the automobile. However, the present invention is not limited thereto. The present invention can be applied to all of equipments, items and parts.

Due to the above-mentioned process, the designer needs not to calculate the kind of the part to be designed when preparing the combinations of the equipments from the equipment specification table. Also, the designer needs not to manually instruct the part application to all of the product variations one by one when preparing the part table from the product variation table. That is, the load on the designer can be reduced. Moreover, the data process enables the speed of the processing to be faster, and the precision is improved.

Next, a case when an equipment change in a product (a change in an application destination about the existing equipment) occurs will be described below with reference to the drawings.

Figure 18:
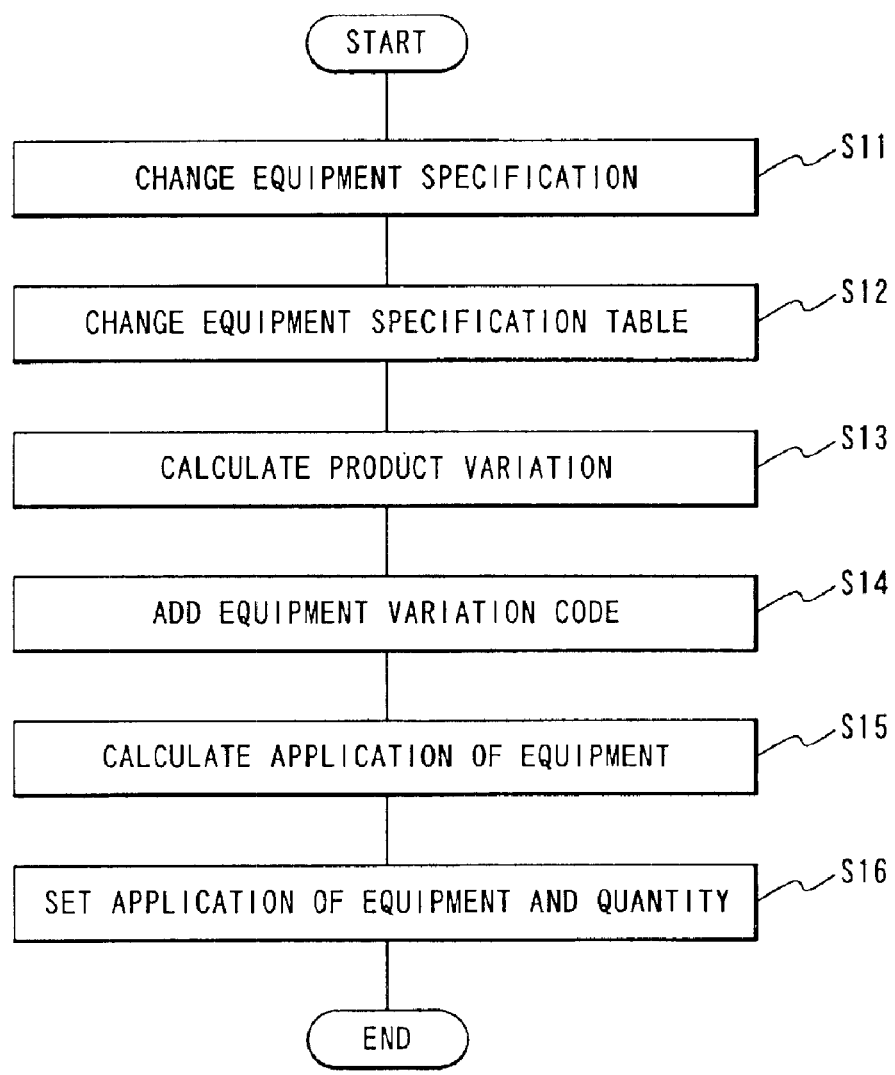
FIG. 18 is a flowchart showing another embodiment of a designing support method of the present invention.

FIG. 18 is a flowchart showing the case when the equipment change in the product occurs, in the embodiment of the equipment application calculating apparatus of the present invention. Here, the case when the equipment is changed in FIGS. 2A to 3C will be described. FIGS. 2A and 2B correspond to FIGS. 4A and 4B, and FIGS. 3A to 3C correspond to FIGS. 5A to 5C. The notations corresponding to FIGS. 2A to 3C are indicated such that [′(Dashes)] are given to the same notations as in FIGS. 4A to 5C. Thus, their descriptions are omitted.

(1) Step S11

The manager, the designer or the like determines the change in the specification of the part and generates a new product specification data. The product specification data contains a kind and type or grade of the product, the equipments to be used therein, and the combination of the equipments and the like are determined so as to be changed. The changes of the product specification data are stored in the product specification database 21.

(2) Step S12

The equipment application instructing section 11 refers to the product specification database 21 in accordance with the product specification data inputted from the input and output unit 3 by the designer and determines the change of the equipment specification. Then, the equipment specification table is changed. The changed equipment specification table is stored in the product specification database 21.

Figure 4A:
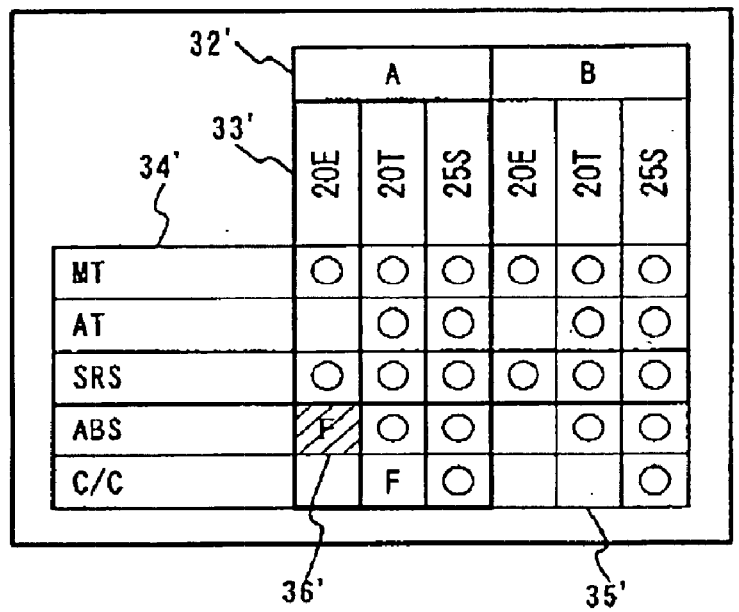
FIG. 4A is a changed type based equipment specification table.

Here, the equipment specification table will be described. FIG. 4A is a diagram showing the changed equipment specification table. The case when the equipment specification shown in FIG. 2A is changed to thereby become the content shown in FIG. 4A will be described.

The equipment specification table 31′ is similar to the equipment specification table 31 shown in FIGS. 2A and 2C. However, as shown in a field 36′ of check fields 35′, the equipment change is carried out on the product of the type 20E of the kind A such that ABS is added as an option.

That is, at the step S12, the change is carried out on the check fields 35′ in accordance with the change of the equipment specification.

(3) Step S13

The derivative calculating section 12 calculates the combinations of equipments in accordance with the change in the equipment specification table. The calculating method will be described later. If the combinations of the equipments are stored in the derivative database 24, the changed combinations of the equipments are stored in the derivative database 24.

(4) Step S14

The variation calculating section 13 produces the changed product variation table in accordance with the changed combinations of the equipments. The changed product variation table is stored in the product variation database 23.

Figure 4B:
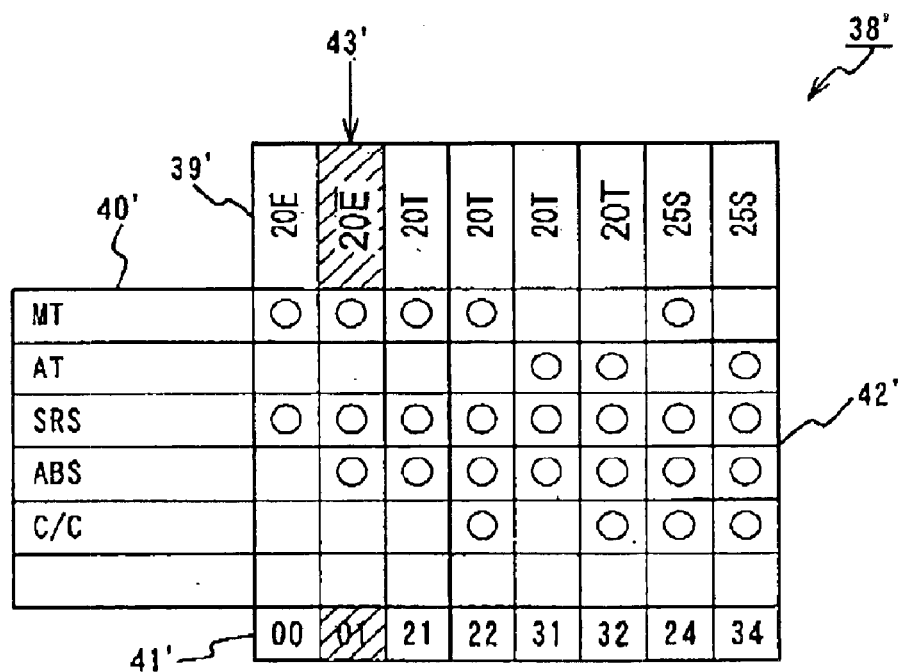
FIG. 4B is a diagram showing a changed type-based equipment table.

Here, the changed product variation table will be described. FIG. 4B is a diagram showing the changed product variation table. The change in the equipment specification causes the product variation table to be changed from FIG. 2B to FIG. 4B. A product variation table 38′ is similar to the product variation table 38 shown in FIGS. 2A and 2B. However, as shown on a column 43′ in type column 39′, the equipment change leads to the addition of [Type 20E—Product Variation Code 01], which is one of the product variations.

That is, at the step S14, the change may be carried out on the type column 39′ in association with the change of the equipment specification.

Figure 5A:
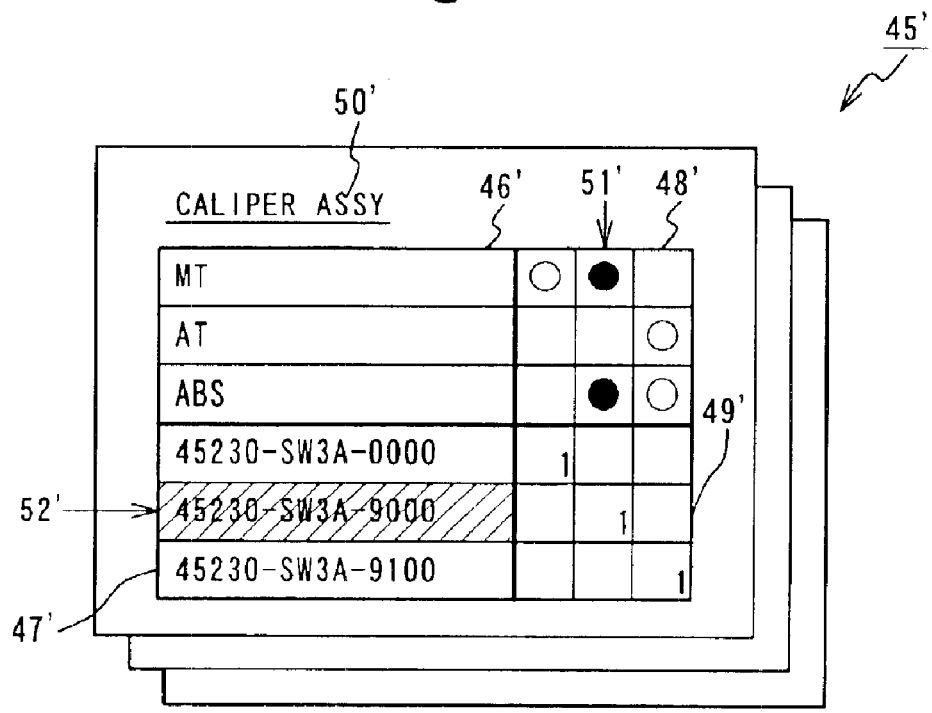
FIG. 5A is a diagram showing a equipment-part number table.

The design change is the change in the application destination with regard to the existing equipment. Even if the column 43′ in the type columns 39′ shown in FIG. 4B is increased, the kinds of the transmission (MT, AT) and ABS are never changed. Thus, a part property table 45′ shown in FIG. 5A is perfectly the same as the part property table shown in FIG. 3A. Thus, even if the equipment is changed, it is not necessary to change the part property table. That is, the step corresponding to the step S05 is not required.

(5) Step S15

The equipment combination calculating section 15 extracts the product variations having the combinations of selected equipments as the extraction product variation from the product variation table in accordance with the combinations of selected equipments. At this time, newly extracted extraction product variations may be produced, depending on the equipment change. The extracted extraction product variations are stored in the equipment combination database 26.

Figure 5B:
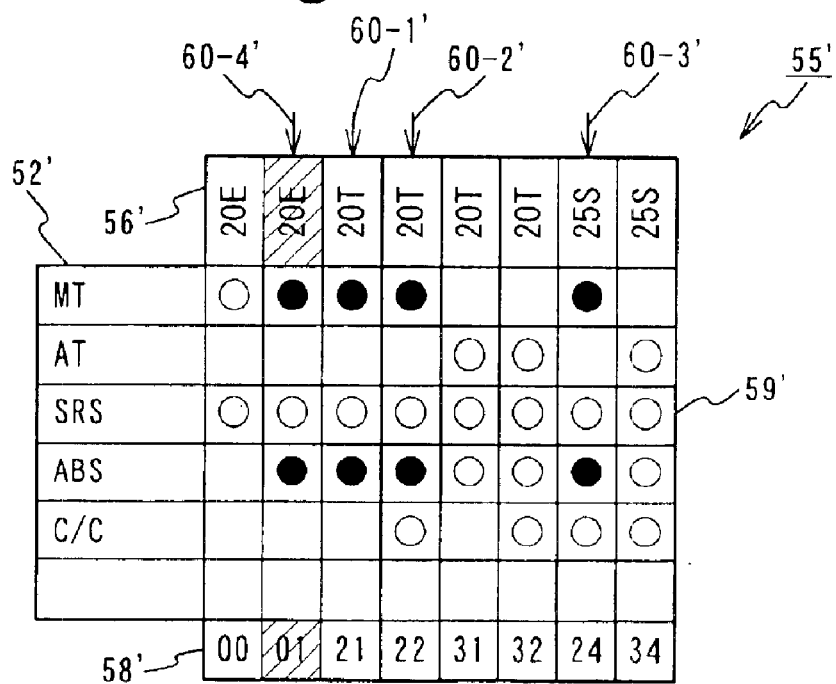
FIG. 5B is a diagram showing a type-based equipment table for explaining a changed extraction product variation.

Next, the extraction product variation will be described. FIG. 5B is a diagram showing the product variation table to explain the changed extraction product variations. Due to the change in the equipment specification, the product variation table is changed from FIG. 3B to FIG. 5B. The product variation table 55' is similar to the product variation table 55 shown in FIGS. 3A to 3C. However, a column 60-4' in type columns 56' newly generated by the equipment change, namely, a combination (20E, 01) of the type column 60-4' and the product variation code row 58' is newly extracted as the extraction product variation having MT and ABS.

That is, at the step S15, the equipment change may cause the extraction product variation to be newly extracted.

(6) Step S16

The application calculating section 16 changes the part table in accordance with the changed product variation code in the changed extraction product variation. The part application to the product variation code and the number are changed. The changed part table is stored in the equipment part table database 27.

Figure 5C:
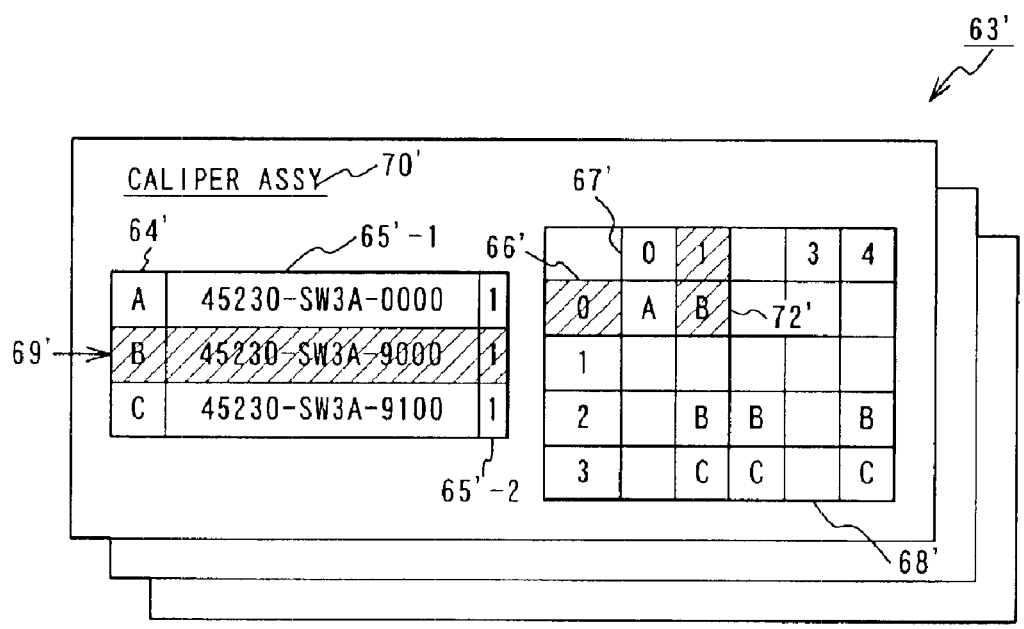
FIG. 5C is a diagram showing a changed part table.

Here, the changed property table will be described. FIG. 5C is a diagram showing the changed part table. Due to the change in the equipment change, the part table is changed from FIG. 3C to FIG. 5C. The part table 63' is similar to the part table 63 shown in FIGS. 3A to 3C. However, as for a part notation B (a part number 45230-SW3A-9000), the equipment change leads to the increase in the extraction product variation code 01. For this reason, as shown in part fields 68', the part notation B is newly added in a field 72' of a product variation code A row 66', and a product variation code B column 67'=(0, 1) shown in FIG. 5C.

That is, at the step S16, the part table is automatically changed in accordance with the product variation code of the extraction product variation.

In the above-mentioned equipment changing process, at the step S12, if the designer inputs the equipment change to the equipment specification table, the calculation is automatically advanced to the step S16. That is, the production for the part table after the equipment change can be executed very quickly and precisely.

Next, the calculating method of the combinations of the equipments at the steps S03, S13 and the calculating method of the combinations of selected equipments at the steps S05, S14 will be described below.

The management of the data in the equipment specification table (for example, FIG. 2A, FIG. 4A) serving as premise is described.

FIGS. 6A to 6C are diagrams explaining the management of the data in the equipment specification table which correlates each of the plurality of types of products and each of the plurality of equipments in accordance with the specification. With reference to FIG. 6A, an equipment specification table 80 has type columns 81, equipment rows 82 and check fields 83. The type column 81 is the column indicative of a type or grade of the product. The equipment row 82 is the row indicative of the equipment. The check field 82 is a field, which shows the relation between the equipment and the type and also shows the possession of the corresponding equipment of the corresponding type by writing a white round to this column. For the purpose of simple explanation, the cases of three types (EX, DX and LX) of the product and two types (MT or AT, S/R) of equipments are described. However, the present invention is not limited to this.

The equipment specification table (a screen on a display of the input and output unit 3, or a paper outputted from a printer) typically has the shape shown in FIG. 6A. However, data is stored in units of equipments in the equipment specification database 22, as shown in FIGS. 6B and 6C.

Now, FIGS. 6B and 6C are described. FIG. 6B shows a mission equipment specification data 85, which has type columns 86, equipment rows 87 and check fields 88. FIG. 6C shows a sunroof equipment specification data 90, which has type columns 91, an equipment row 92 and check fields 93. The meanings in the respective columns are similar to FIG. 6A. In this case, as possible kinds in the respective equipments, there are MT and AT (MISSION), S/R and NO S/R (S/R). However, F is an option. When the kind of the equipment is displayed or outputted in accordance with those type columns (86, 91), the mission equipment specification data 85 and the sunroof equipment specification data 90 are coupled as shown in FIG. 6A. The data is stored in units of the equipments. Thus, even if the equipment should be added, it is enough to add the data which correlates each of the plurality of types of products and the equipment, as shown in FIGS. 6B and 6C. Thus, a changed range of the equipment specification database 22 may be narrow for the increase or decrease in the kind of the equipment and the increase or decrease in the equipment.

The calculating method of the combinations of equipments at the steps S03, S13 will be described below. Prior to the description of the calculating method, the management of the data for calculation of the combinations of equipments to be carried out by the derivative calculating section 12 will be described.

FIGS. 7A to 7D are diagrams showing the management of the data used to calculate the combinations of equipments to be carried out by the derivative calculating section 12. FIGS. 7A to 7D show the example of the case of the three types (EX, DX and LX) of the product and the two kinds of equipments (MT or AT, S/R), correspondingly to FIGS. 6A to 6C.

FIG. 7A shows an equipment ID data 95 of a mission for every type and FIG. 7B shows a mission equipment ID data 99. The mission equipment ID data 99 includes column ID columns 100, equipment rows 101 and check fields 102. The equipment row 101 is the row indicative of the equipment. The column ID column 100 is a column ID assigned for each equipment, and is a numeral. The check field 102 is a field, which shows the relation between the column ID and the equipment and also shows the possession of the corresponding column ID of the corresponding equipment by writing a white round. In the case of this mission equipment ID data 99, a column ID1 is given to MT and a column ID2 is given to AT. The equipment ID data 95 has type columns 96 and equipment column ID rows 97. The type column 96 shows a type or grade of a product. The equipment column ID row 97 shows a column ID indicative of an equipment possessed by each type of the product. In case of this equipment ID data 95, since the type EX has the settings of MT and AT (FIG. 6B), the column ID1 and the column ID2 are given, and since the types DX and LX have the setting of AT (FIG. 6C), the column ID2 is given.

FIG. 7C shows an equipment ID data 104 of S/R (sunroof) for every type and FIG. 7D shows a sunroof equipment ID data 108. The sunroof equipment ID data 108 includes column ID columns 109, equipment rows 110 and check fields 111. The respective columns are similar to FIG. 7B. In the case of this sunroof equipment ID data 108, a column ID3 is given to NO S/R (having no sunroof) and a column ID4 is given to S/R (having the sunroof). The equipment ID data 104 has type columns 105 and equipment column ID rows 106. The respective columns are similar to FIG. 7A. In case of this equipment ID data 104, since the type EX has only the setting of S/R (FIG. 6C), a column ID4 is given. The types DX and LX indicate that the S/R is optional (equal to the above-mentioned case) and has the settings NO S/R and S/R, the column ID3 and the column ID4 are given.

Figure 19:
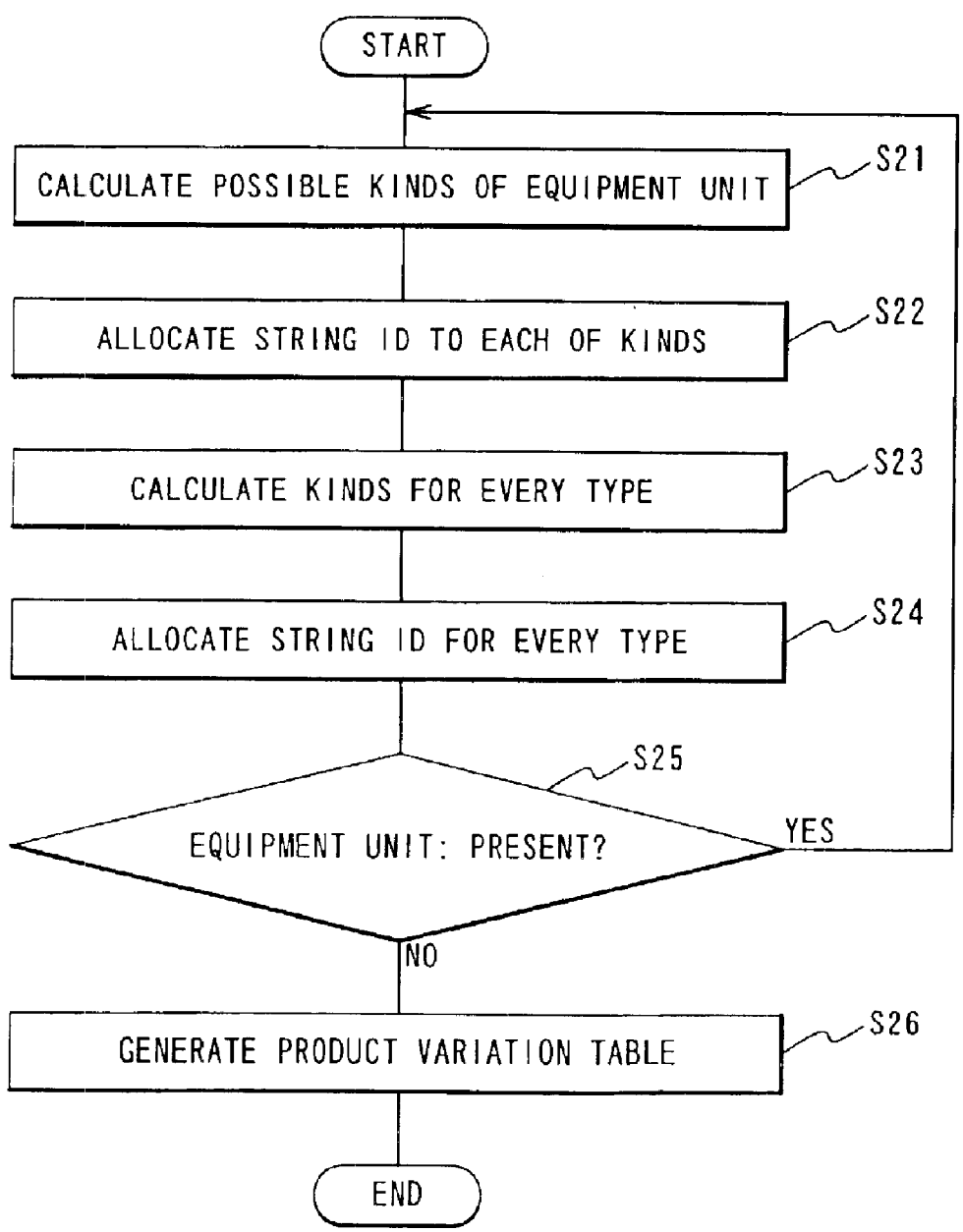
FIG. 19 is a flowchart showing a method of calculating an equipment variation in a type based equipment specification table.

The calculating method of the combinations of equipments variation in the equipment specification table 80 will be described. FIG. 19 is a flowchart showing the method of calculating the combinations of equipments in the equipment specification table 80.

(1) Step S21

The derivative calculating section 12 refers to the mission equipment specification data 85 (FIG. 6B) in the equipment specification database 22 and determines the number of the kinds of the equipments. In case of mission as the equipment, two kinds of MT and AT from the equipment rows 87 are determined.

(2) Step S22

The derivative calculating section 12 gives the column IDs to the two kinds of the equipments. In this case, the column IDs are not previously used and different from each other. Then, the mission equipment ID data 99 is produced as shown in FIG. 7B. The mission equipment ID data 99 is stored in the derivative database 24.

(3) Step S23

The derivative calculating section 12 refers to the mission equipment specification data 85 (FIG. 6B) and determines which of the missions is set for each of the types of the products. Thus, it is determined that the type EX has the settings of MT and AT and that the types DX and LX have the setting of AT.

(4) Step S24

The derivative calculating section 12 gives the column ID to each of the types of the products in accordance with the determination result and the mission equipment ID data 99. Thus, the derivative calculating section 12 produces the equipment ID data 95 for every type, as shown in FIG. 7A. The equipment ID data 95 for every type is stored in the derivative database 24.

(5) Step S25

The derivative calculating section 12 checks whether or not there is the additional equipment in the equipment specification table 80. If yes, the operational flow returns back to the (1) step S21. For example, the derivative calculating section 12 produces the sunroof equipment ID data 108 as shown in FIG. 7D, and the equipment ID data 104 for every type as shown in FIG. 7C). They are stored in the derivative database 24. If not so, the operational flow proceeds to the step S26.

(6) Step S26

The derivative calculating section 12 determines the combinations of the equipments in accordance with the equipment ID data 95 for every type and the equipment ID data 104 for every type. As for the type EX, the mission has the two kinds of the column ID1 and the column ID2, and the S/R has the one kind of the column ID4. Thus, the combinations of the equipments in the types EX are 1-4 and 2-4. Similarly, the combinations of the equipments of the types DX and LX are 2-3 and 2-4.

Thus, the product variation table can be produced in accordance with the combinations of the equipments and the mission equipment ID data 99 and the sunroof equipment ID data 108. The combinations of the equipments may be stored in the derivative database 24.

The above-mentioned calculation examples are described by exemplifying the three types of the products and the two kinds of equipments. However, the present invention is not limited to the above-mentioned calculation examples. The method can be limitlessly increased depending on the types of the specification product and the kinds of the equipments.

This calculating method calculates and stores the data in units of equipments. Thus, even if a new equipment is added, it is enough to additionally carry out the calculation in units of equipments as described in the calculating methods (1) to (4) and produce the additional data shown in FIGS. 7A to 7D. Thus, the increase in the calculation amount is small with respect to the increase or decrease in the equipment and the increase or decrease in the equipment item. Also, the changed range of the product variation database 23 is small.

Figure 20:
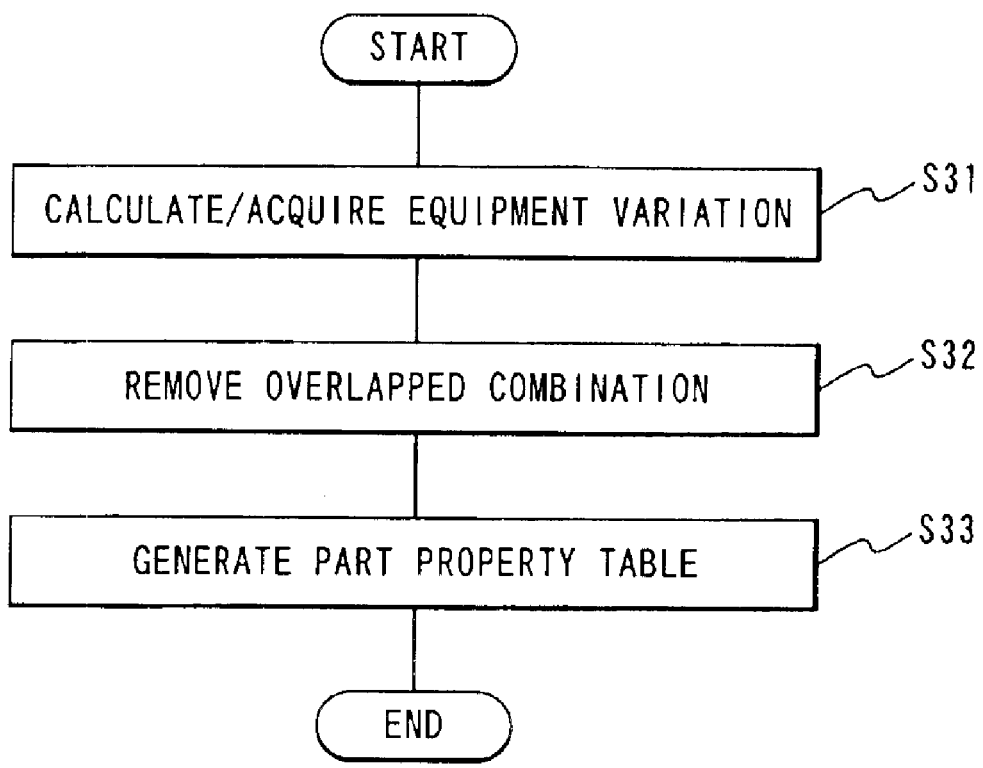
FIG. 20 is a flowchart showing a calculating method of a specification difference equipment variation.

Next, the calculating method of the combinations of selected equipments at the steps S05 and S14 will be described below. FIG. 20 is a flowchart showing the calculating method of the combinations of selected equipments.

(1) Step S31

Figure 8B:
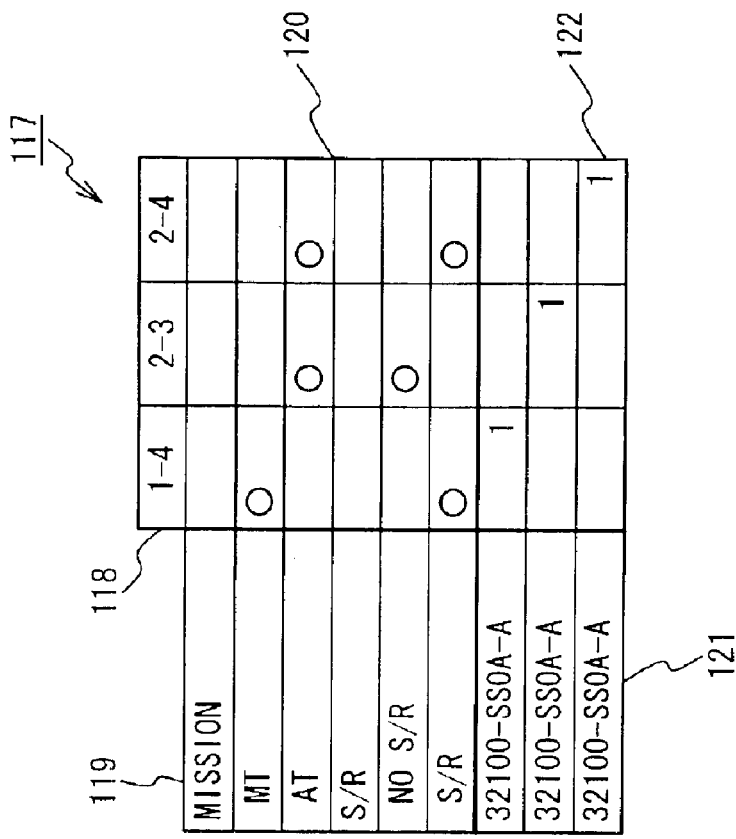
FIG. 8B is a diagram showing the equipment-part number table.
Figure 8A:
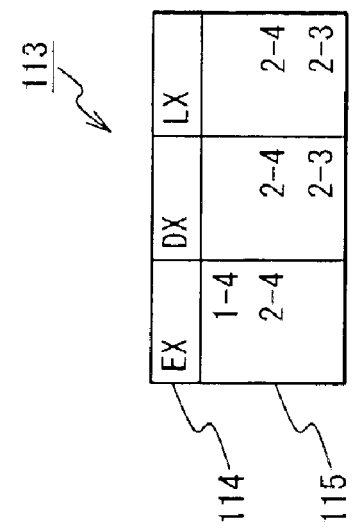
FIG. 8A is a diagram showing a type-based total equipment ID table.

The derivative calculating section 12 determines the combinations of the equipments in accordance with the equipment ID data 95 in the derivative database 24 and the equipment ID data 104. Or, the derivative calculating section 12 takes out each of the already-calculated combinations of the equipments from the derivative database 24. As mentioned above (the step S26), as for the type EX, mission has the two kinds of the column ID1 and the column ID2, and S/R has the one kind of the column ID4. Thus, the combinations of the types EX are 1-4 and 2-4. Similarly, the types DX and LX are 2-3 and 2-4. FIGS. 8A and 8B show the result.

FIG. 8A is a diagram showing the combinations of the equipments as the relation between the type and the equipment ID data. The combinations of the equipments 113 have type columns 114 and a combination row 115. The type column 114 shows the type or grade of the product. The combination column 115 shows the combination of the column IDs indicative of the combinations of equipments possessed by each of the types. In case of the combinations of the equipments 113, as mentioned above, the types EX are 1-4 and 2-4. Similarly, the types DX and LX are 2-3 and 2-4.

(2) Step S32

If the calculation is advanced from the combination of the type EX, the combination of 2-4 of the type DX already exists in the type EX. Similarly, the combinations of 2-3 and 2-4 of the type LX already exist in the type EX and the type DX. Thus, the calculation may not be carried out as the combination. That is, the duplication in the combination is deleted. Thus, in this example, six combinations may be considered in this example. Actually, the calculation may be carried out for three combinations. In this case, they are 1-4, 2-3 and 2-4.

(3) Step S33

In accordance with the combinations of the column IDs in the combination columns 115, the mission equipment ID data 99 and the sunroof equipment ID data 108, the combinations of 1-4, 2-3 and 2-4 are converted into the combination of the equipments. Then, the upper half of the part property table is produced. FIG. 8B shows that part property table.

FIG. 8B is a diagram showing the part property table similar to FIG. 3A and FIG. 5A. The part property table 117 correlates the selected equipment, the combinations of selected equipments and the part number. The part property table 117 has the combination columns 118 (omitted in FIG. 3A and FIG. 5A), equipment rows 119, equipment check fields 120, part number rows 121 and application number fields 122. The combination column 118 shows the combination of the column IDs in the combinations of the equipments column 115. The equipment row 119 shows the equipment. The part number row 121 shows the part number. The equipment check field 120 shows the combination of the equipments corresponding to the combination of the column IDs in the combination column 118. The application number field 122 shows the correlation between the number of the combinations of the column IDs and the part number in the part number row 121. Thus, the combination of column IDs of 1-4 shows MT and S/R, the combination of 2-3 shows AT and NO S/R, and the combination of 2-4 shows AT and S/R. At this time, for the application number in the row 121 of the part number corresponding to the combination of the equipments, "1" is set as an initial value (default). The combination columns 118, the equipment rows 119, the equipment check fields 120 and the application number fields 121 in the part property table 117 are calculated from the above-mentioned (1) to (3) calculations.

The calculating method of the plurality of combinations of the equipments at the steps S03 to S13 described with reference to FIGS. 6A to 8B and the calculating method of the combinations of selected equipments at the steps S05 to S014 may be achieved by using the following method in case of a set option (an equipment to be set only if a certain equipment is set).

The management of the data in the equipment specification table will be described. FIGS. 9A and 9B are diagrams showing the management of the data in the equipment specification table. With reference to FIG. 9A, an equipment specification table 124 has type columns 125, equipment rows 126 and check fields 127. They are similar to FIG. 6A. However, a set option column 125-1 indicative of the set option is added to the type columns 125. In the set option column 125-1, A:F=AT is set that if the mission is AT, A is F (Set Option). Also, B:0=S/R(0) is set that if there is S/R, there is TCS. Here, for the purpose of simple description, three kinds of types (EX, DX and LX) and four kinds of equipments (MT or AT, S/R, TCS and FR FOG) are exemplified. However, the present invention is not limited to their kinds. Also, in case of FIG. 9A, the equipment specification database 22 stores the data in units of equipments (MISSION, S/R, TCS and FR FOG) as shown in FIGS. 6B and 6C. In addition to them, the equipment specification database 22 similarly stores the data indicative of the set option. FIG. 9B shows it. FIG. 9B shows an option equipment specification data 129, and has set option ID columns 130, equipment rows 131 and check fields 132. The set option ID column 130 shows set IDs as possible combinations of set options. The equipment row 131 shows the equipment. The check field 132 shows the relation between the equipment and the option combination. The check field 132 is set by selecting from all of the possible combinations of the selected equipments. That selection is executed in accordance with A:F=AT and B:0=S/R(0) in the set option column 125-1. Here, it is known that there are three kinds of sets (Set ID=1 to 3). The set 1 is the set without AT, S/R and TCS. The set 2 is the set with AT and without S/R and TCS. The set 3 is the set with AT, S/R and TCS.

By the way, the option equipment specification data 129 is stored in the equipment specification database 22.

The calculating method of the plurality of combinations of the equipments at the steps S03 to S13 will be described below. Prior to the description of the calculating method, the management of the data is described which is used to calculate the plurality of combinations of the equipments to be carried out by the derivative calculating section 12.

FIGS. 10A to 10D are diagrams showing the management of the data used to calculate the plurality of combinations of the equipments to be carried out by the derivative calculating section 12. FIGS. 10A to 10D show the examples of the case of the three kinds of the types and the four kinds of the equipments, correspondingly to FIGS. 9A and 9B.

In FIG. 10A, each data is the data when the mission, S/R and TCS are combined. The reason why they are combined is that the option set is related to the combination of those three elements. FIG. 10B shows a mission relation equipment ID data 138 and FIG. 10A shows an equipment ID data 134. The mission relation equipment ID data 138 includes column ID columns 139, equipment rows 140 and check fields 141. The meanings of the respective columns are similar to the case of FIG. 7B. As the column ID columns 139, the numbers 1 to 3 of the sets (the sets 1 to 3) are written to be indicated in the set option ID columns 130 of the option equipment specification data 129.

The mission relation equipment ID data 138 is the data in units of equipments shown in FIGS. 6B and 6C. The mission relation equipment ID data 138 is calculated by using the option equipment specification data 129, in addition to the mission equipment specification data, the sunroof equipment specification data and the TCS equipment specification data. The equipment ID data 134 has type columns 135 and an equipment column ID row 136. The type columns 135 and the equipment column ID row 136 are similar to those shown in FIG. 7A. In case of this equipment ID data 134, the column ID1 to the column ID3 are given to the type EX, since there are the sets 1 to 3 shown in the set option ID columns 130 (FIGS. 9A and 9B) of the option equipment specification data 129, and the column ID2 and the column ID3 are given to the types DX and LX since there are the sets 2 and 3.

FIGS. 10C and 10D are related to the case of the case of FR FOG (Fog Lamp). FIG. 10C shows equipment ID data 143 and FIG. 10D shows a fog lamp equipment ID data 147. The fog lamp equipment ID data 147 has column ID columns 148, equipment rows 149 and check fields 150. The respective columns are similar to those of FIG. 7C. In the case of this fog lamp equipment ID data 147, a column ID4 is given to NO FR FOG (having no fog lamp), and a column ID5 is given to FR FOG (having a fog lamp). The equipment ID data 143 has type columns 144 and an equipment column ID row 145. The respective columns are similar to those of FIG. 7C. In the case of this equipment ID data 143, the column ID4 and the column ID5 are given to the type EX and the types DX and LX since all of them have the settings of NO FR FOG and FR FOG.

Next, the calculating method of the combinations of the set option equipments will be described below by exemplifying the method of calculating the combinations of the equipments in the equipment specification table 124. FIG. 19 is a flowchart explaining the calculating method of the combinations of the set option equipments.

(1) Step S21

The derivative calculating section 12 calculates the number of the kinds in units of equipments in accordance with the mission equipment specification data (for example, FIG. 6B) of the equipment specification database 22, the sunroof equipment specification data (for example, FIG. 6C), a TCS equipment specification data (not shown) and a fog lamp equipment specification data (not shown). Here, the number of kinds is calculated as two kinds for each of the cases of MISSION, S/R and TCS. Then, the derivative calculating section 12 leaves the three kinds of combinations allowed in the option equipment specification data 129, among 8 (=2× 2×2) combinations.

(2) Step S22

The derivative calculating section 12 gives the column IDs to the combinations of the three kinds of the equipments. In this case, those that were not previously used and which are different from each other are used. Then, the derivative calculating section 12 produces the mission relation equipment ID data 138 as shown in FIG. 10B. The mission equipment ID data 138 is stored in the derivative database 24.

(3) Step S23

The derivative calculating section 12 refers to the equipment specification table 124 and determines which of the sets is set for each of the types. Here, the type EX has the sets 1 to 3. Therefore, the types DX and LX have the set 2 and the set 3.

(4) Step S24

The derivative calculating section 12 gives the column ID to each of the types in accordance with the determination result and the mission relation equipment ID data 138. Then, the derivative calculating section 12 produces the equipment ID data 134 as shown in FIG. 10A. The equipment ID data 134 is stored in the derivative database 24.

(5) Step S25

The derivative calculating section 12 checks whether there is further the equipment in the equipment specification table 124. If there is any equipment, the operational flow returns back the (1) step S21. For example, the derivative calculating section 12 produces a fog lamp equipment ID data 147 shown in FIG. 10D and an equipment ID data 143 shown in FIG. 10C. They are stored in the derivative database 24. If there is no equipment, the operational flow proceeds to a step S26.

(6) Step S26

The derivative calculating section 12 calculates the combinations of the equipments in accordance with the equipment ID data 134 and the equipment ID data 143. Here, as for the type EX, the mission relation has the three kinds of the column ID1 to the column ID3, and FR FOG has the two kinds of the column ID4 and the column ID2. Thus, the combinations of the equipments in the type EX are 1-4, 1-5, 2-4, 2-5, 3-4 and 3-5. Similarly, the combinations of the equipments in the types DX and LX are 2-4, 2-5, 3-4 and 3-5. The product variation table can be produced in accordance with the combinations of the equipments, the mission relation equipment ID data 138 and the fog lamp equipment ID data 147. The combinations of the equipments may be stored in the derivative database 24.

The above-mentioned calculation examples are described by illustrating the example in which the three types, the four kinds of the equipments and the three kinds of the equipments indicate the option relation. However, the above-mentioned calculating methods are not limited to this. The increase and the change can be limitlessly executed depending on the type of the product and the kinds of the equipments.

In this calculating method, even if the option set is newly set or added, by defining the data of the option set in the form of the option equipment specification data 129, it is enough to additionally carry out the calculation in units of option sets and to produce the additional data as shown in FIG. 11A, as described in the above-mentioned calculating methods (1) to (4). Thus, the increase in the calculation amount may be small for the increase or decrease in the equipment and the increase or decrease in the equipment item. Also, the change range of the product variation database 23 may be narrow.

Next, the calculating method of the combinations of selected equipments at the steps S05 and S14 will be described below. FIG. 20 is a flowchart showing the calculating method of the combinations of selected equipments.

(1) Step S31

The derivative calculating section 12 determines the combinations of the equipments in accordance with the equipment ID data 134 and the equipment ID data 143 in the derivative database 24. Or, the derivative calculating section 12 takes out each of the already calculated combinations of the equipments from the derivative database 24. Here, as mentioned above (the step S26), the combinations of the equipments in the type EX are 1-4, 1-5, 2-4, 2-5, 3-4 and 3-5. Similarly, the combinations of the equipments in the type DX and the type LX are 2-4, 2-5, 3-4 and 3-5. FIGS. 11A and 11B show this result. FIG. 11A is a diagram showing the combinations of the equipments as the relation between the type and the equipment ID data. The combinations of the equipments 152 have type columns 153 and a combination row 154. The respective columns are similar to FIG. 8A. In case of the combinations of the equipments 152, as mentioned above, the combinations are 1-4, 1-5, 2-4, 2-5, 3-4 and 3-5 for the type EX. Similarly, the combinations are 2-4, 2-5, 3-4 and 3-5 for the type DX and the type LX.

(2) Step S32

If the calculation is advanced from the combination of the type EX, the combinations of 2-4, 2-5, 3-4 and 3-5 for the type DX and the type LX already exist in the type EX. Thus, the calculation may not be carried out. That is, the duplication in the combination is deleted. Thus, in this example, 14 combinations may be considered in this example. However, actually, the calculation may be carried out for six combinations. Here, they are 1-4, 1-5, 2-4, 2-5, 3-4 and 3-5.

(3) Step S33

In accordance with the combination of the equipment column IDs in the combinations of the equipments column 154, the mission relation equipment ID data 138 and the fog lamp equipment ID data 147, the combinations of 1-4, 1-5, 2-4, 2-5, 3-4 and 3-5 are converted into the combination of the equipments. Then, the upper half of the part property table is produced. FIG. 11B shows that part property table. FIG. 11B is a diagram showing the part property table similar to FIG. 3A and FIG. 5A. The part property table 156 correlates the selected equipments, the combinations of selected equipments and the part number. The part property table 156 has combination columns 157 (omitted in FIG. 3A and FIG. 5A), equipment rows 158, equipment check fields 160, part number rows 159 and application number fields 161. In FIG. 11B, 160-1 denotes an equipment column ID1, and 160-2 denotes an equipment column ID4. The respective columns are similar to those shown in FIG. 8B. At this time, for the application number in the field 161 of the part number corresponding to the combination of the equipments, "1" is set as the initial value (default). The combinations of the equipments columns 157, the equipment rows 158, the equipment check fields 160 and the application number rows 161 in the part property table 156 are calculated from the above-mentioned (1) to (3) calculations.

Even if the option set is set, only the component satisfying the option set condition is calculated in advance through the calculation as described with reference to FIG. 11A. Thus, the combination having no necessity of the calculation can be deleted to thereby reduce the time necessary for the later calculation and the burden on the system and the like. Therefore, even if the option set is later added, the additional calculation can be easily carried out at a little amount.

In the processes shown in FIGS. 19 and 20, the calculation time of the variation may largely depend on the number of the equipments used in the calculation and the increase in the number of the kinds of the products. However, calculating in advance the combinations of the individual equipments and the application destination product name can remove waste states, such as the repeated calculations of the same combination, and protect against the exponential increase in the calculation time depending on the number of the equipments.

The method of specifying the option and taking out the part number in the present invention will be described below. FIGS. 12A and 12B are diagrams showing the equipment specification table and the product variation table.

With reference to FIG. 12A, an equipment specification table 163 has type columns 164, equipment rows 165 and check fields 166. The type column 164, the equipment row 165 and the check field 166 are similar to the explanation shown in FIGS. 6A to 6C. For the purpose of simple explanation, the case of the two types (EX, DX) of the products and the four kinds of equipments (MT or AT, S/R, FR FOG and k/E) are described. However, the present invention is not limited to this.

With reference to FIG. 12B, the product variation table has type columns 168, equipment rows 169, check fields 170 and a product variation code column 171. The type column 168, the equipment row 169 and the check field 170 are similar to FIG. 12A. The product variation code column 171 shows an identifier (code) of the variation of the product. Here, this is the product variation table corresponding to FIG. 12A. However, this is the product variation table based on the two kinds of the equipments (MT or AT, S/R). In this case, as the product variation, EX has four kinds, and DX has one kind. Let us suppose that they are J01 to J04 and J05, respectively, with regard to the product variation code.

By the way, the present invention is not limited to those kinds.

FIGS. 13A and 13B are diagrams showing a part property table (for example, FIG. 3A) of an item 61000 in the equipment specification table 163. The calculating method is as mentioned above. With reference to FIG. 13A, the part property table 173 has type columns 174, equipment rows 175, equipment check fields 177, part number rows 176 and application number fields 178. The type columns 174, the equipment rows 175, the equipment check fields 177, the part number rows 176 and the application number fields 178 are similar to the explanation shown in FIG. 3A. In this case, the equipment to determine the specification difference of the item 61000 is defined as MISSION. Also, as parts of the item 61000, a part of a part number A is set for MT and a part of a part number B is set for AT. Thus, the part of the part number A is used only in the type EX, and the part of the part number B is used in the type EX and the type DX.

FIG. 13B is a diagram showing a code part correspondence table as the table to indicate the relation between the respective product variation codes J01 to J05 in that case and the usage parts. With reference to FIG. 13B, a code part correspondence table 180 has product variation code columns 181 and check fields 182. Here, J01, J02 indicate the usage of the part of the part number A, and J03 to J05 indicate the usage of the part of the part number B.

FIGS. 14A and 14B are diagrams showing a part property table (for example, FIG. 3A) of an item 62100 of the equipment specification table 163. With reference to FIG. 14A, the part property table 184 has type columns 185, equipment rows 186, equipment check fields 188, part number rows 187 and application number fields 189. The type columns 185, the equipment rows 186, the equipment check fields 188, the part number rows 187 and the application number fields 189 are similar to the explanation shown in FIG. 13A. In this case, the equipment to determine the specification difference of the item 62100 is defined as S/R and FR FOG. Also, as parts of the item 62100, parts of part numbers C, D and E are set for the settable combinations of S/R and FR FOG. Thus, the part of the part number C is used only in the type EX, and the part of the part number D is used in the type EX and the type DX, and the part of the part number E is used only in the type DX.

FIG. 14B is a diagram showing a code part correspondence table as the table to indicate the relation between the respective product variation codes J01 to J05 in that case and the usage parts. With reference to FIG. 14B, the code part correspondence table 191 has product variation code columns 192 and check fields 193. Here, J01 and J03 indicate the usage of the part of the part number C, and J02, J04 and J05 indicate the usage of the part of the part number D, and J05 further shows the usage of the part of the part number E.

FIGS. 15A and 15B are diagrams showing a part property table (for example, FIG. 3A) of an item 63100 in the equipment specification table 163. The calculating method is as mentioned above. With reference to FIG. 15A, a part property table 195 has type columns 196, equipment rows 197, equipment check fields 199, part number rows 198 and application number fields 200. The type columns 196, the equipment rows 197, the equipment check fields 199, the part number rows 198 and the application number fields 200 are similar to the explanation shown in FIG. 14A. In this case, the equipment to determine the specification difference of the item 63100 is defined as FR FOG and K/E (Keyless Entry). Also, as parts of the item 63100, parts of part numbers F, G and H are set for the settable combinations of FR FOG and K/E. Thus, the part of the part number F is used only in the type EX, the part of the part numbers G is used only in the type DX, and the part of the part number H is used only in the type LX.

FIG. 15B is a diagram showing the code part correspondence table as the table to indicate the relation between the respective product variation codes J01 to J05 in that case and the usage parts. With reference to FIG. 15B, a code part correspondence table 202 has product variation code columns 203 and check fields 204. Here, J01 to J04 indicate the usage of the part of the part number F, and J05 shows the usage of the part of the part number H.

Let us consider the case that a part number used for a certain product variation code is retrieved from a group of the part property tables such as the part property table 184 or the part property table 195. In this case, the following processes are executed.

(1) The designer specifies a product variation code and an item, as necessary. Here, they are the product variation code J05 and the items 61000, 62100 and 631000.

(2) The part searching section 17 takes out the part property tables for the respective items stored in the part property database 24, in accordance with the specified product variation code and item. Here, the part searching section 17 takes out the part property table 173, the part property table 184 and the part property table 195.

(3) The part searching section 17 expands the code part correspondence tables from the respective part property tables. Then, the part searching section 17 takes out the part number of the specified product variation code. Here, the part searching section 17 expands the code part correspondence table 180, the code part correspondence table 191 and the code part correspondence table 202 from each of the part property table 173, the part property table 184 and the part property table 195. Then, the part searching section 17 takes out the part number of the column in the product variation code J05 specified by them.

FIGS. 16A and 16B show the taken out result. FIGS. 16A and 16B are diagrams showing a product variation part number table as the table for the part numbers used in the product variation code J05 taken out by the part searching section 17. With reference to FIG. 16A, a product variation part number table 206 has an item column 207, a part number column 208, and a derivative code column 209. The item column 207 shows items. The part number column 208 shows part numbers. The derivative code column 209 shows product variation codes and the checks of the code part correspondence table 180, the code part correspondence table 191 and the code part correspondence table 202. The above-mentioned processes calculate that the part numbers of the respective parts in the respective items applied to the product variation code J05 are B, D, E, G and H.

The above-mentioned processes specify the option. In this case, if a part number is desired to be known, the process (1) simultaneously specifies the option. For example, FR FOG is specified (when there is the fog lamp). Then, at the process (3), if the equipment to determine the specification difference for each of the items includes the specified option, the part number when that option is used is selected. If FR FOG is specified, as for the item 61000 of the part property table 173, the selection for the part has no relation to FR FOG. Thus, the part number B is selected. As for the item 62100 of the part property table 184, the option of FR' FOG uses the part number E. Thus, the part number E is selected (the part number D is not selected). As for the item 63100 of the part property table 195, the option of FR FOG uses the part number H. Thus, the part number H is selected (the part number G is not selected).

FIG. 16B shows that result. FIG. 16B is a diagram showing the product variation part number table as the table for the part numbers used in the product variation code J05 taken out by the part searching section 17, after the indication of the option. With reference to FIG. 16B, a product variation part number table 210 has an item column 211, a part number column 212 and a derivative code column 213. The item column 211, the part number column 212 and the derivative code column 213 are similar to FIG. 16A. As mentioned above, it is calculated that the part numbers of the respective parts of the respective items applied to the product variation code J05 are B, E and H. Due to the above-mentioned processes, all of the parts for the product can be taken out by specifying the product variation code and the option equipment.

The application of the part to the product is generated in units of product variation codes. However, the part searching section 17 can take out the parts by using the method of retrieving the parts having the different option specifications, which are defined by the part property tables (173, 184 and 195). Then, without all of the relational tree structures of the different options, it is possible to manage the data whose options are different. Consequently, even if the option equipment is increased or decreased and even if the specification is changed, it is enough to update only the data in the part property table in which that option equipment is used. Thus, the processing time for the data update is minimized, and the burden on the system is little.

According to the present invention, by defining the part application for each kind of the equipment, the setting of the part application can be calculated automatically, quickly and accurately.

Also, after the change of the equipment specification table, the influence on the part property table can be automatically calculated. The system side can provide the increase or decrease in the variation of the combination of the equipments. Moreover, the automatic instruction of the part application to the same variation can be treated quickly and accurately. Then, the application of the part can be accurately adapted to the increase or decrease in the product variation and the change of the option specification and the like.

Advantageous Effects of the Invention

According to the present invention, it is possible to provide the high convenience in the variation change, the part retrieval and the like, and protect against the miss of the application setting and the like, and further manage all of the variations of the product at the high precision.

Although there have been described what are the present embodiments of the invention, it will be understood by persons skilled in the art that variations and modifications may be made thereto without departing from the spirit or essence of the invention.

What is claimed is:

1. An equipment application calculating apparatus comprising:
    a product variation calculating section which determines a product variation table based on variations of a product and specification of each of said product variations, said product variation table correlating each of said product variations and equipments related to said specifications of said product variations, said equipments being variously associated with different items;
    a part applying section which determines, from said product variation table based on combinations of selected ones of said equipments, a part property table for each said item wherein said part property table correlates each of said combinations of said selected equipments and a part; and
    a part table calculating section which determines a part table for said item from said product variation table and said part property table to correlate each of said product variations and said part.

2. The equipment application calculating apparatus according to claim 1, wherein said product variation calculating section comprises:
    an equipment application instructing section which determines an equipment specification table based on said specification of each of said product variations to correlate each of said product variations and each of said equipments;
    a derivative calculating section which determines a combination table from said equipment specification table to indicate possible combinations or said equipments; and
    a variation calculating section which determines said product variation table from said combination table based on said product variations.

3. The equipment application calculating apparatus according to claim 2, further comprising:
    an equipment specification database which stores said equipment specification table divisionally for each of said equipments.

4. The equipment application calculating apparatus according to claim 1, wherein said part table calculating section comprises:
    an equipment combination calculating section which extracts product variations associated with combinations of said selected equipments as extraction product variations from said part property table; and
    an application calculating section which determines said part table from said part property table and said production variation table.

5. The equipment application calculating apparatus according to claim 1, further comprising:
    a part searching section which searches said parts containing a designated equipment by using said product variation table and said part property table.

6. A designing support method comprising the steps of:
(a) determining a product variation table based on variations of a product and specification of each of said product variations, said product variation table correlating each of said product variations and equipments related to said specifications of said product variations, said equipments being variously associated with different items;
(b) determining a part property table for each item from said product variation table based on combinations of selected ones of said equipments, wherein said part property table correlates each of said combinations of said selected equipments and a part; and
(c) determining a part table for said item from said product variation table and said part property table to correlate each of said product variations and said part.

7. The designing support method according to claim 6, wherein said step of (a) determining a product variation table comprises the steps of:
determining an equipment specification table based on said specification of each of said product variations to correlate each of said product variations and each of said equipments;
determining a combination table from said equipment specification table to indicate possible combinations of said equipments; and
(d) determining said product variation table from said combination table based on said product variations.

8. The designing support method according to claim 7, wherein said step of (d) determining said product variation table comprises the steps of:
allocating identifiers different from each other to each of said combinations of said equipments; and
correlating each of said product variations to each of said equipments.

9. The designing support method according to claim 7, further comprising the step of:
storing said equipment specification table in an equipment specification database divisionally for each of said equipments.

10. The designing support method according to claim 6, wherein said step of (c) determining a part table comprises the steps of:
extracting said product variations associated with combinations of said selected equipments as extraction product variations from said part property table; and
determining said part table from said part property table and said production variation table.

11. The designing support method according to claim 6, wherein said step of (b) determining a part property table comprises the steps of:
designating said item;
selecting said selected equipments from among said equipments;
removing duplication of said combinations of said selected equipments; and
correlating each of said combinations of said selected equipments to said part for the item.

12. The designing support method according to claim 6, further comprising:
designating one of said product variations from said product variation table; and
retrieving said parts used for said designated product variation from said part property tables for said items for said designated variation.

13. A program stored in a recording medium and executed by a computer, said program comprises the functions of:
(a) determining a product variation table based on variations of a product and specification of each of said product variations, said product variation table correlating each of said product variations end equipments related to said specifications of said product variations, said equipments being variously associated with different items;
(b) determining a part property table for each item from said product variation table based on combinations of selected ones of said equipments, wherein said part property table correlates each of said combinations of said selected equipments and apart; and
(c) determining a part table for said item from said product variation table and said part property table to correlate each of said product variations and said part.

14. The program according to claim 13, wherein said function of (a) determining a product variation table comprises the functions of:
determining an equipment specification table based on said specification of each of said product variations to correlate each of said product variations and each of said equipments;
determining a combination table from said equipment specification table to indicate possible combinations of said equipments; and
(d) determining said product variation table from said combination table based on said product variations.

15. The program according to claim 14, wherein said function of (d) determining said product variation table comprises the functions of:
allocating identifiers different from each other to each of said combinations of said equipments; and
correlating each of said product variations to each of said equipments.

16. The program according to claim 13, further comprising the function of:
storing said equipment specification table in an equipment specification database divisionally for each of said equipments.

17. The program according to claim 13, wherein said function of (c) determining a part table comprises the functions of:
extracting said product variations associated with combinations of said selected equipments as extraction product variations from said part property table; and
determining said part table from said part property table and said production variation table.

18. The program according to claim 13, wherein said function of (b) determining a part property table comprises the functions of:
designating said item;
selecting said selected equipments from among said equipments;
removing duplication of said combinations of said selected equipments; and
correlating each of said combinations of said selected equipments to said part.

19. The program according to claim 13, further comprising:
designating one of said product variations from said product variation table; and
retrieving said parts used for said designated product variation from said part property tables for said items for said designated variation.

* * * * *

UNITED STATES PATENT AND TRADEMARK OFFICE
CERTIFICATE OF CORRECTION

PATENT NO.    : 6,965,807 B2
DATED         : November 15, 2005
INVENTOR(S)   : Mito et al.

It is certified that error appears in the above-identified patent and that said Letters Patent is hereby corrected as shown below:

Title page,
Item [56], References Cited, FOREIGN PATENT DOCUMENTS, change
"JP           09-20449            8/1997" to
-- JP         09-204449           8/1997 --.
Item [57], ABSTRACT,
Line 7, change "a part applyipg section" to -- a part applying section --.

Drawings,
Sheet 18 of 22, Fig. 16A, change "PART  " to -- PART    --;
                                  NUMER       NUMBER
              Fig. 16B, change "PART  " to -- PART    --.
                               NUMER         NUMBER Column 4,
Lines 50 and 65, change "a type based equipment" to -- a type-based equipment --.
Line 58, change "changed type based equipment" to -- changed type-based equipment --.
Line 61, change "showing a equipment-part" to -- showing an equipment-part --.

Column 5,
Line 1, change "a type based equip-" to -- a type-based equip- --.
Line 12, change "the type based equipment" to -- the type-based equipment --.
Lines 14, 30, 34 and 38, change "in an type based" to -- in a type-based --.
Lines 24, 29, 33 and 37, change "showing a equipment-part" to -- showing an equipment-part --.
Line 26, change "an type based equipment" to -- a type-based equipment --.
Line 50, change "a type based equipment" to -- a type-based equipment --.

Column 6,
Line 56, change "section 14 produce" to -- section 14 produces --.

Column 8,
Line 35, change "corresponds the equipment" to -- corresponds to the equipment --.

Column 9,
Line 28, change "one of combinations" to -- one of the combinations --.

Column 12,
Line 38, change "in type column" to -- in type columns --.

Column 17,
Line 36, begin a new paragraph at "In addition to".

UNITED STATES PATENT AND TRADEMARK OFFICE
CERTIFICATE OF CORRECTION

PATENT NO.    : 6,965,807 B2
DATED         : November 15, 2005
INVENTOR(S)   : Mito et al.

It is certified that error appears in the above-identified patent and that said Letters Patent is hereby corrected as shown below:

Column 18,
Line 26, change "related to the case of the case of" to -- related to the case of --.

Column 19,
Line 18, change "returns back the" to -- returns back to the --.

Column 21,
Line 13, change "FR FOG and k/E)" to -- FR FOG and K/E) --.

Column 22,
Line 28, change "part numbers G" to -- part number G --.

Column 23,
Line 22, change "option of FR' FOG" to -- option of FR FOG --.

Column 24,
Line 43, change "combinations or said" to -- combinations of said --.

Column 26,
Line 14, change "equipments and apart;" to -- equipments and a part; --.

Signed and Sealed this

Thirteenth Day of June, 2006

JON W. DUDAS
*Director of the United States Patent and Trademark Office*